United States Patent
Kwon et al.

(10) Patent No.: US 8,854,107 B2
(45) Date of Patent: Oct. 7, 2014

(54) INTEGRATOR CIRCUIT WITH INVERTING INTEGRATOR AND NON-INVERTING INTEGRATOR

(75) Inventors: Oh-Jin Kwon, Daejeon (KR); Il-Hyun Yun, Daejeon (KR); Seon-Woong Jang, Daejeon (KR); Hyung-Cheol Shin, Daejeon (KR)

(73) Assignee: Zinitix Co., Ltd., Daejeon (KR)

( * ) Notice: Subject to any disclaimer, the term of this patent is extended or adjusted under 35 U.S.C. 154(b) by 547 days.

(21) Appl. No.: 13/105,055

(22) Filed: May 11, 2011

(65) Prior Publication Data

US 2011/0273400 A1    Nov. 10, 2011

(30) Foreign Application Priority Data

May 4, 2010   (KR) .......................... 10-2010-0045188
Sep. 30, 2010  (KR) .......................... 10-2010-0095041

(51) Int. Cl.
*G06G 7/18*      (2006.01)
*G06F 3/041*     (2006.01)
*G06F 3/044*     (2006.01)
*G06G 7/184*     (2006.01)

(52) U.S. Cl.
CPC ............. *G06G 7/184* (2013.01); *G06F 3/0416* (2013.01); *G06F 3/044* (2013.01)

USPC ........................................... 327/337; 327/336

(58) Field of Classification Search
USPC ................. 327/337, 336, 345, 554
See application file for complete search history.

(56) References Cited

U.S. PATENT DOCUMENTS

| 4,331,894 | A | 5/1982 | Gregorian et al. |
| 4,999,634 | A * | 3/1991 | Brazdrum et al. ............ 341/172 |
| 5,168,179 | A | 12/1992 | Negahban-Hagh |
| 8,179,183 | B2 * | 5/2012 | Costa-Domingues et al. ............................. 327/337 |
| 2011/0163768 | A1 * | 7/2011 | Kwon et al. .................. 324/686 |

FOREIGN PATENT DOCUMENTS

| JP | 05-322650 A | 7/1993 |
| JP | 06-060689 A | 4/1994 |

* cited by examiner

*Primary Examiner* — Hai L Nguyen
(74) *Attorney, Agent, or Firm* — Stuart H. Mayer; Mayer & Williams PC

(57) ABSTRACT

A switched capacitor integrator circuit is disclosed. The switched capacitor integrator circuit comprises an inverting switched capacitor integrator circuit, and a non-inverting switched capacitor integrator circuit connected to the inverting switched capacitor integrator circuit. A sampling capacitor of the inverting switched capacitor integrator circuit is shared by the non-inverting switched capacitor integrator circuit.

21 Claims, 18 Drawing Sheets

FIG. 3
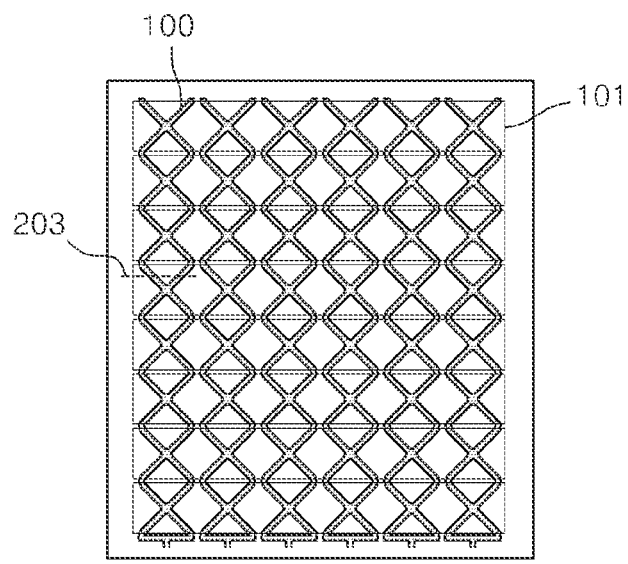
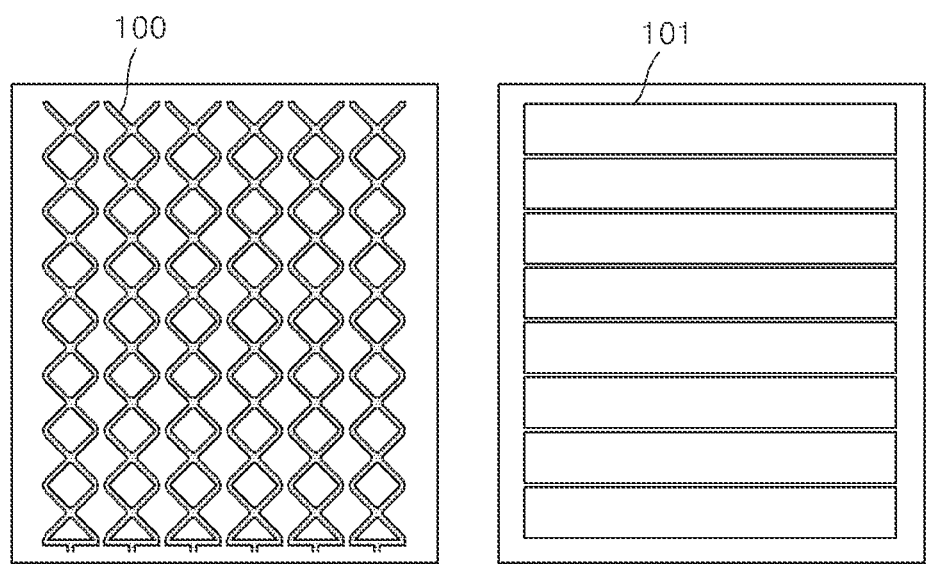

INTEGRATOR CIRCUIT WITH INVERTING INTEGRATOR AND NON-INVERTING INTEGRATOR

CROSS-REFERENCE TO RELATED APPLICATION

This application claims priority to Korean Patent Application No. 10-2010-0045188 filed on May 14, 2010, and Korean Patent Application No. 10-2010-0095041 filed on Sep. 30, 2010, and all the benefits accruing therefrom under 35 U.S.C. §119, the contents of which are incorporated by reference in their entirety.

BACKGROUND

The present disclosure relates to an integrator circuit, and more particularly, to a noise-robust integrator circuit.

Display devices such as a liquid crystal display and organic light emitting display, portable communication devices, and information processing devices, and etc. perform their functions using various input devices. As a type of such input devices, touch screen devices are being widely used in portable phones, smart phones, palm-size PCs, and automated teller machines (ATM).

Touch screens perform desired commands, by contacting a finger, touch pen, or stylus on their screens to write text or draw and execute program codes by selecting icons. Touch screen devices can sense whether a finger or touch pen has been contacted on the surface of themselves and determine the contact position.

Touch screens may be sorted into resistive type and capacitive type touch screens according to their touch sensing method.

A resistive type touch screen has a configuration where resistive material is coated on a glass or transparent plastic plate and then polyester film is covered thereon. The resistive type touch screen detects resistance variation to sense a touch point when its screen is touched. The resistive type touch screen has a limitation of being incapable of sensing a touch input when touch pressure is weak.

A capacitive type touch screen may be supplied by forming electrodes at both or one side of a glass or transparent plastic plate. The capacitive type touch screen can detects a touch point by applying a voltage between two electrodes and then analyzing a variation of capacitance between the two electrodes when an object, such as a finger, touches its screen.

A capacitive type touch screen requires a circuit for measuring capacitance formed at one electrode or between two electrodes to sense a touch point. Such capacitance measuring circuits have been used mainly for measuring capacitances of various circuits or devices. However, because various portable devices now provide touch input interfaces, the application range of capacitance measuring circuits for sensing a contact or proximity of a user is expanding.

Capacitance measuring circuits used for touch screens of typical portable phones have limitations in that malfunctions arise by various noises caused by changes in the surrounding environments.

SUMMARY

The present disclosure provides a noise-robust integrator circuit.

The present disclosure also provides a method for reducing input sensing errors due to noises generated from a touch input by applying the noise-robust integrator circuit to a sensor block for sensing a touch screen input.

In accordance with an aspect of the present invention, provided herein is an integrator circuit, comprising: a first operational amplifier; a second operational amplifier; and a capacitor. Inverting input terminals of the first and second operational amplifiers are configured to be connected to a first terminal of the capacitor through a first switch and a second switch, respectively. A second terminal of the capacitor is configured to be connected to a first potential and a second potential through a third switch and a fourth switch, respectively. The inverting input terminal and an output terminal of the first operational amplifier are configured to be connected to each other through a first feedback capacitor. The inverting input terminal and an output terminal of the second operational amplifier are configured to be connected to each other through a second feedback capacitor. And non-inverting input terminals of the first and second operational amplifiers are configured to be connected to a third potential.

The third potential may be the same as the second potential.

A first reset switch may be configured to be connected between the inverting input and the output terminals of the first operational amplifier in parallel with the first feedback capacitor, and a second reset switch may be configured to be connected between the inverting input and the output terminals of the second operational amplifier in parallel with the second feedback capacitor The first switch and the third switch may be driven by a first clock, and the second switch and the fourth switch may be driven by a second clock.

On-intervals of the first clock and the second clock may be alternately represented on the time axis. Part of the on-intervals of the first clock and part of the on-intervals of the second clock may occur simultaneously. Alternatively, when one of the first clock and the second clock is in on-state, other one may be in off-state.

The capacitor may be formed by a sensing pattern and a driving pattern formed in a capacitive type touch screen.

One of both terminals of the capacitor connected to the first operational amplifier and second operational amplifier may correspond to the sensing pattern.

The sensing pattern may be disposed at outer side of the touch screen compared to the driving pattern. In other words, the sensing pattern may be disposed closer to a touching object like a finger than the driving pattern.

One of both terminals of the capacitor connected to the first and second operational amplifiers may be an in-flowing path of noise input by cable or wireless.

In accordance with another aspect of the present invention, provided herein is an input sensing circuit of a capacitive type touch screen where a sensing pattern and a driving pattern are formed. The input sensing circuit comprises: a first operational amplifier; and a second operational amplifier. The sensing pattern is configured to be connected to an inverting input terminal of the first operational amplifier through a first switch and connected to an inverting input terminal of the second operational amplifier through a second switch, respectively. The driving pattern is configured to be connected to a first potential and a second potential through a third switch and a fourth switch, respectively. The inverting input terminal and an output terminal of the first operational amplifier are configured to be connected to each other through a first feedback capacitor, and the inverting input terminal and an output terminal of the second operational amplifier are configure to be connected to each other through a second feedback capacitor. And non-inverting input terminals of the first and second operational amplifiers are connected to a third potential.

The first switch and the third switch may be driven by a first clock, and the second switch and the fourth switch are driven by a second clock.

In accordance with still another aspect of the present invention, a switched capacitor integrator circuit is provided. The switched capacitor integrator circuit comprises an inverting switched capacitor integrator circuit; and a non-inverting switched capacitor integrator circuit connected to the inverting switched capacitor integrator circuit. A sampling capacitor of the inverting switched capacitor integrator circuit is shared by the non-inverting switched capacitor integrator circuit.

The inverting switched capacitor integrator circuit may integrate electric charges which are charged in the sampling capacitor with time to output a negative voltage, and the non-inverting switched capacitor integrator circuit may integrate electric charges which are charged in the sampling capacitor with time to output a positive voltage.

At least a portion of integration time interval of the inverting switched capacitor integrator circuit may not overlap integration time interval of the non-inverting switched capacitor integrator circuit.

The sampling capacitor may be formed by a sensing pattern and a driving pattern formed in a capacitive type touch screen.

One of both terminals of the sampling capacitor, which is connected to the inverting switched capacitor integrator circuit and the non-inverting switched capacitor integrator circuit, may be an in-flowing path of noise input by cable or wireless.

In accordance with still another aspect of the present invention, an integrator circuit is provided. The integrator circuit comprises a capacitor; a charge/discharge circuit connected to the capacitor to charge/discharge the capacitor; an inverting integrator circuit connected to the charge/discharge circuit; and a non-inverting integrator circuit connected to the charge/discharge circuit.

The inverting integrator circuit may integrate electric charges which are charged in the capacitor with time to output a negative voltage, and the non-inverting integrator circuit may integrate electric charges which are charged in the capacitor with time to output a positive voltage.

The capacitor may be formed by a sensing pattern and a driving pattern formed in a capacitive type touch screen.

One of both terminals of the capacitor, which is connected to the inverting integrator circuit and the non-inverting integrator circuit, may be an in-flowing path of noise input by cable or wireless.

At least a portion of integration time interval of the inverting integrator circuit may not overlap integration time interval of the non-inverting integrator circuit.

One of both terminals of the capacitor connected to the first operational amplifier and second operational amplifier may correspond to the sensing pattern.

The sensing pattern may be disposed at outer side of the touch screen compared to the driving pattern.

In accordance with still another aspect of the present invention, an integrator circuit is provided. The integrator circuit comprises: a first operational amplifier; a second operational amplifier; and a capacitor. Inverting input terminals of the first and second operational amplifiers are configured to be connected to a first terminal of the capacitor, respectively. The inverting input terminal and an output terminal of the first operational amplifier are configured to be connected to each other through a first feedback capacitor and a first switch connected in series, and the inverting input terminal and an output terminal of the second operational amplifier are configured to be connected to each other through a second feedback capacitor and a second switch connected in series. A second terminal of the capacitor is configured to be connected to a first potential and a second potential through a third switch and a fourth switch, respectively. And non-inverting input terminals of the first and second operational amplifiers are connected to a third potential.

The third potential may be the same as the second potential.

A first reset switch may be configured to be connected between the inverting input and the output terminals of the first operational amplifier in parallel with the first feedback capacitor, and a second reset switch may be configured to be connected between the inverting input and the output terminals of the second operational amplifier in parallel with the second feedback capacitor.

BRIEF DESCRIPTION OF THE DRAWINGS

Exemplary embodiments can be understood in more detail from the following description taken in conjunction with the accompanying drawings, in which:

FIGS. 1 to 4 illustrates configurations of an exemplary touch screen device for which an embodiment of the present invention is applicable;

DETAILED DESCRIPTION OF EMBODIMENTS

Hereinafter, some embodiments of the present invention will be described in detail with reference to the accompanying drawings. Although the present invention has been described with reference to specific embodiments, the scope of the present invention is not limited thereto. Therefore, it will be readily understood by those skilled in the art that various modifications and changes can be made thereto without departing from the spirit and scope of the present invention defined by the appended claims. In the following description, the technical terms are used only to explain a specific exemplary embodiment while not limiting the present invention. The terms of a singular form may include plural forms unless referred to the contrary.

Figure 1:
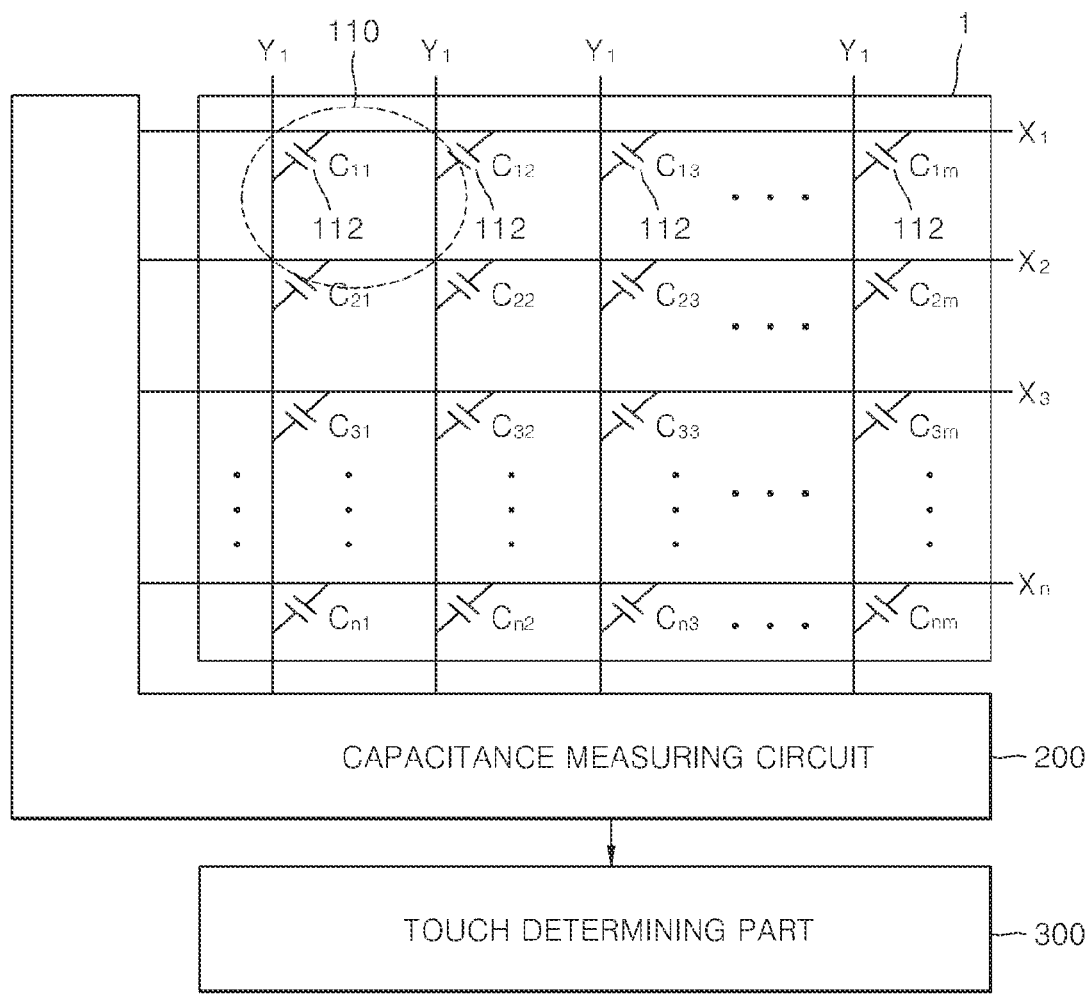

FIG. 1 illustrates a touch screen device for applying an embodiment of the present invention.

As illustrated in FIG. 1, the touch screen device may include a touch panel 1, a capacitance measuring circuit 200, and a touch determining part 300.

The touch panel 1 may include a plurality of sensing signal lines Y1, Y2, Y3, . . . , Yn and driving signal lines X1, X2, X3, . . . , Xn that are formed to be insulated to each other. The sensing signal lines and driving signal lines are indicated as lines in FIG. 1 for the sake of convenience, but may be actually implemented as electrode patterns. The term 'sensing signal line' may be used interchangeably with the terms 'sensing line' and 'sensing electrode', and the term 'driving signal line' may be used interchangeably with the terms 'driving line' and 'driving electrode'. In FIG. 1, the plurality of sensing signal lines and driving signal lines are indicated to be mutually insulated and intersecting, but the present invention is not limited thereto. The sensing signal lines and driving signal lines may not intersect to each other, depending on specific implementations.

A sensing node 110 indicating a touch point may be defined as a combination of one sensing signal line and one driving signal line, and each sensing node 110 include a node capacitor 112. The node capacitor 112 may be formed by a sensing signal line and driving signal line that are mutually insulated and separated. In FIG. 1, the capacitance of the node capacitor 112 formed by an i-th driving signal line and j-th sensing signal line is indicated as $C_{ij}$.

The capacitance measuring circuit 200 is electrically connected to the plurality of sensing signal lines Y1, Y2, Y3, . . . , Yn and driving signal lines X1, X2, X3, . . . , Xn, to measure capacitance $C_{ij}$ of the node capacitor 112.

The touch determining part 300 analyzes capacitance variation on the basis of the capacitance of the node capacitor 112 measured by the capacitance measuring circuit 200 to sense a touch point where a user touches.

Figure 2:
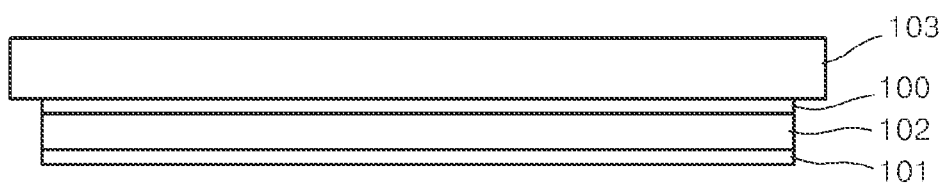

FIG. 2 illustrates an example of the touch screen device of FIG. 1.

FIG. 2 is a conceptual configuration diagram for describing operations of the touch screen panel that is directly touched, in the entire touch screen device for determining whether a touch input is made by an object. A sensing pattern 100 and driving pattern 101 may be formed of a conductive material and electrically connected to the touch screen driving circuit and additional devices, to be used when it is determined whether a touch input is made. Accordingly, various touch screen panels may be provided according to the shapes of the sensing pattern 100 and driving pattern 101. Dielectric layer 102 may be disposed between the sensing pattern 100 and driving pattern 101. Accordingly, the sensing pattern 100 and driving pattern 101 formed of a conductive material can form a capacitor with the dielectric layer 102 therebetween. A protection window 103 may be formed on the sensing pattern 100 to protect the sensing pattern 100, driving pattern 101, and dielectric 102. Capacitance between the sensing pattern 100 and the driving pattern 101 may change when a touching object is on or in proximity of the protection window 103.

FIG. 3 is a plane view of the conceptual configuration diagram of the touch screen device of FIG. 2.

FIG. 3 illustrates the sensing pattern 100 and the driving pattern 101 simultaneously.

A plurality of wide rectangular driving patterns 101 may be formed in a touch screen device. When a voltage is applied to the driving pattern 101, an electric field is generated between the sensing pattern 100 and driving pattern 101. The sensing pattern 100 may have a shape narrower than the driving pattern 101. Accordingly, when a voltage is applied to the driving pattern 101, the sensing pattern 100 cannot entirely cover the driving pattern 101. The electric field flows from the driving pattern 101 to the sensing pattern 100. When a touch input occurs, at least a part of the electric field flows to the touching object, in other words, the electric fields changes when a touch input occurs. Thus the electric field formed between the sensing pattern 100 and driving pattern 101 changes with touch input. This change in electric field causes a change of capacitance formed between the sensing pattern 100 and driving pattern 101. A sensor may sense the capacitance value to determine whether a touch input is made.

The pattern of FIG. 3 is an example of various electrode patterns of a touch screen for convenience in description and clarity. It will be understood that the spirit and scope of the present invention is limited thereto.

Figure 4:
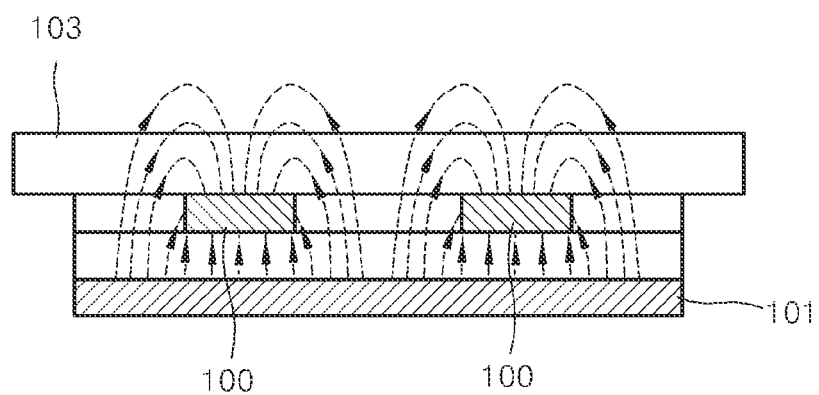

FIG. 4 is a sectional view taken along a line 203 of FIG. 3.

Referring to FIG. 4, when a touch input is made to an area occupied by the electric fields (i.e., dot lines) over the protection window 103, a total amount of electric charges accumulated in a capacitor is reduced when compared with no touch input because at least part of the electric field paths of entering the sensing pattern 100 through the area changes. Thus, if it is sensed that the capacitance between the driving pattern 101 and the sensing pattern 100 decreases, it may be determined that a touch input has been occurred at that point.

To the present, one of principles for determining whether a touch input is made to a touch screen has been described. Some embodiments of the present invention used for measuring the capacitance variation will be described below.

Figure 5:
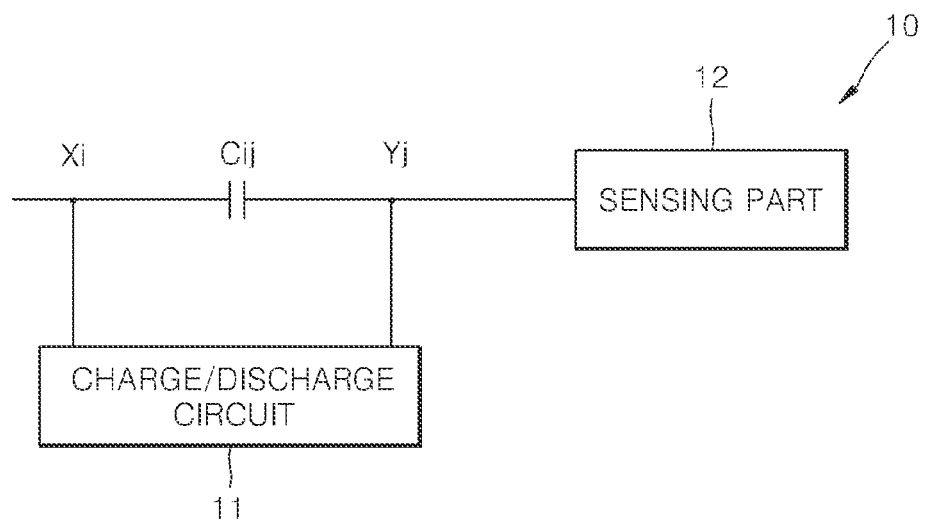
FIG. 5 is a schematic diagram illustrating a driving circuit that may be used for driving a touch screen, according to an embodiment of the present invention.

FIG. 5 is a schematic diagram illustrating a driving circuit that may be used for driving a touch screen according to an embodiment of the present invention.

As illustrated in FIG. 5, a driving circuit 10 may include a charge/discharge circuit 11, a sensing part 12, and a capacitor $C_{ij}$. Since the 'sensing part' 12 has an integrating function, it may be referred to as 'integration part' in this specification. The charge/discharge circuit 11 may be electrically connected to both terminals of the capacitor $C_{ij}$, as a circuit for charging the capacitor $C_{ij}$ to a power supply voltage $V_{cc}$ and discharging the capacitor $C_{ij}$ to the ground voltage GND. Hereinafter, the 'capacitor $C_{ij}$' may be referred to as a 'sampling capacitor'.

If the driving circuit 10 is used for driving a touch screen, the capacitor $C_{ij}$ of FIG. 5 may correspond to the node capacitor 112 described above. In other words, the capacitor $C_{ij}$ may be electrically connected to a driving signal line Xi and sensing signal line Yj, and the charge/discharge circuit 11 may repeat charge/discharge operations a plurality of N times.

Noise may be input to the driving circuit of FIG. 5 through the sensing signal line Yj. In this case, the noise may be integrated by sensing part 12 to undesirably affect the output of the sensing part 12. A configuration of a noise-robust integrator according to an embodiment of the present invention will be described below.

Figure 6:
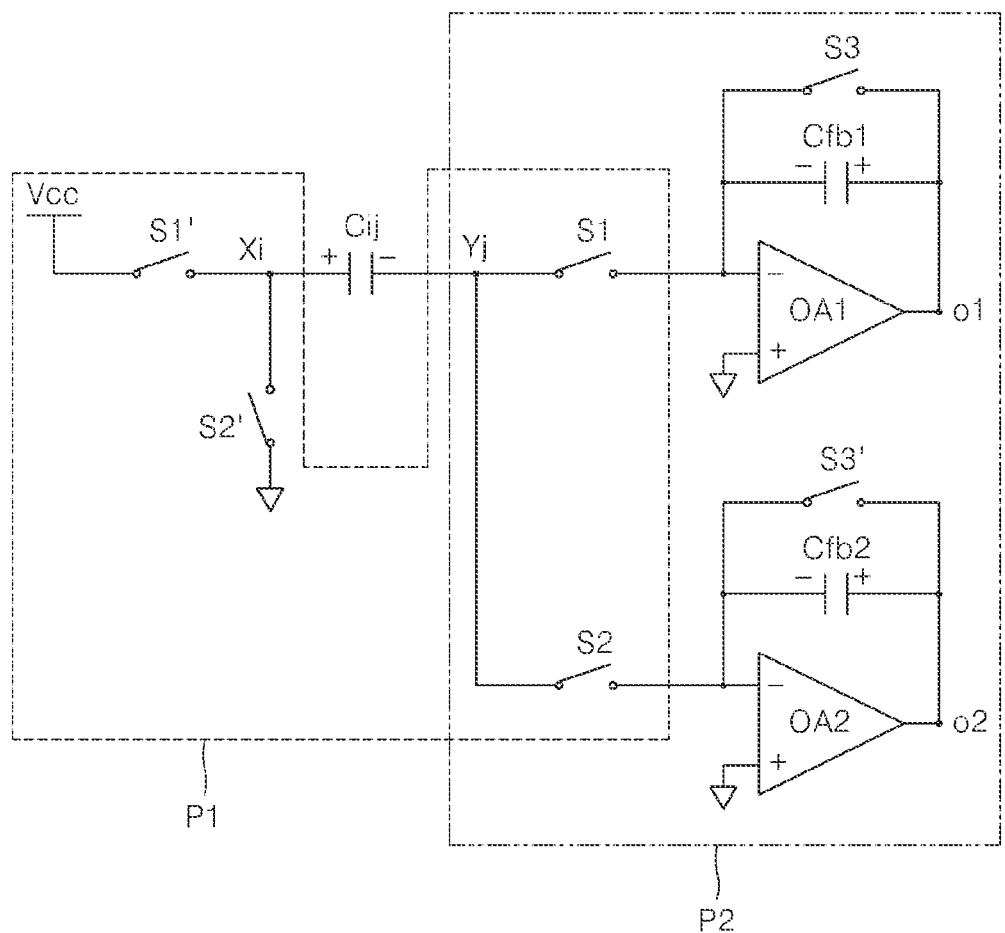
FIG. 6 illustrates a configuration of an integrator according to an embodiment of the present invention.

FIG. 6 illustrates a configuration of an integrator according to an embodiment of the present invention.

Referring to FIG. 6, the integrator includes a first operational amplifier OA1, a second operational amplifier OA2, and a capacitor $C_{ij}$. Inverting input terminals of the first operational amplifier OA1 and second operational amplifier OA2 are connected to a first terminal Yj of the capacitor $C_{ij}$ through a first switch S1 and a second switch S2, respectively. A second terminal Xi of the capacitor $C_{ij}$ is connected to a first potential $V_{cc}$ through a third switch S1' and a second potential GND through a fourth switch S2'. Hereinafter, the second potential GND is assumed as zero for convenience. The inverting input terminal and an output terminal of the first operational amplifier OA1 may be connected to each other through a first feedback capacitor $C_{fb1}$. The inverting input terminal and an output terminal of the second operational amplifier OA2 may be connected to each other through a second feedback capacitor $C_{fb2}$. The non-inverting input terminals of the first operational amplifier OA1 and the second operational amplifier OA2 may be connected to the third potential. The third potential may be the ground potential GND though not restricted thereto.

A reset switches S3 may be connected between the inverting input terminal and output terminal of the first operational amplifier OA1. A reset switch S3' may be connected between the inverting input terminal and output terminal of the second operational amplifier OA2. When the reset switches S3 and S3 are turned on, electric charges that are charged in the first feedback capacitor $C_{fb1}$/and the second feedback capacitor $C_{fb2}$ are all discharged to make the voltages across both terminals zero. The reset switches S3 and S3' may operate at the same timing according to embodiments.

Figure 7:
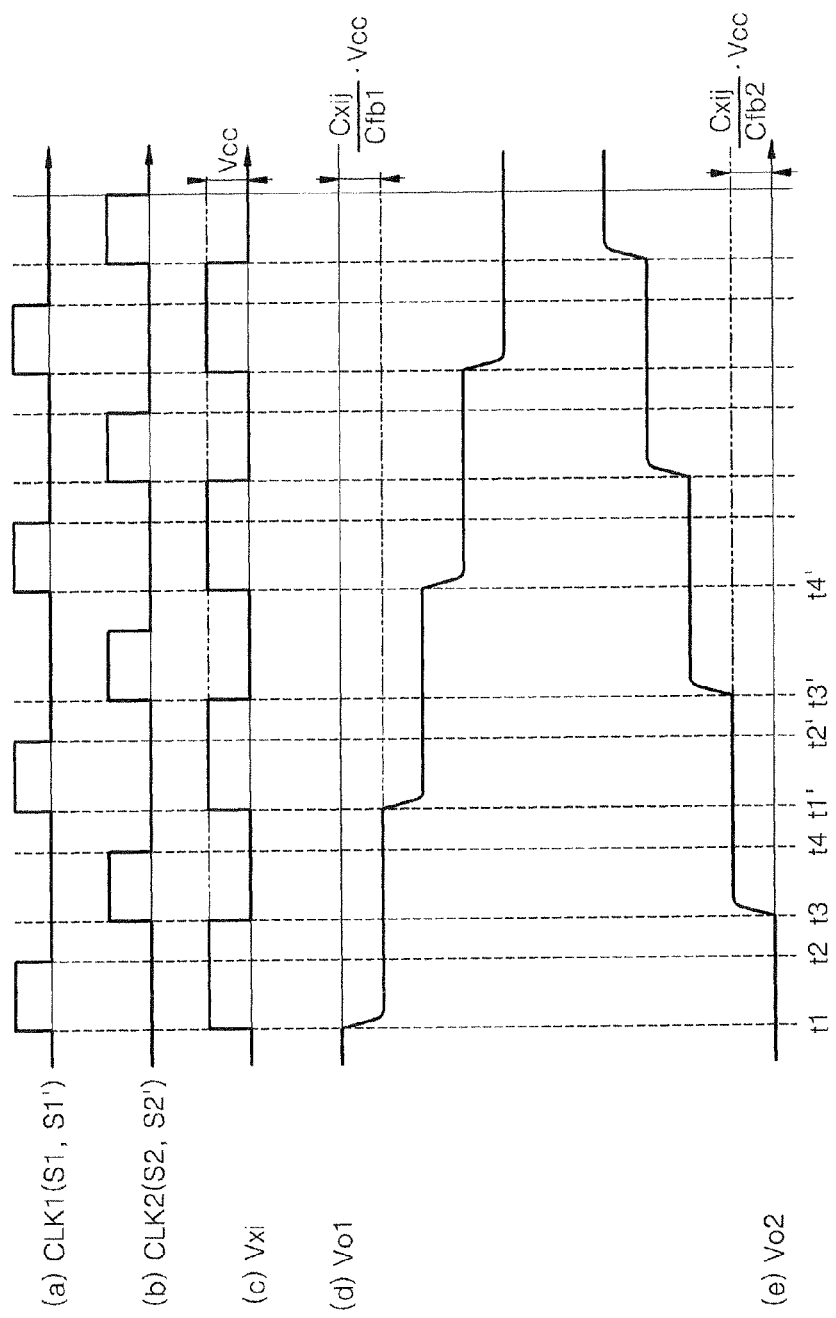
FIG. 7 is a timing diagram showing each node state of the integrator with time according to an embodiment of the present invention.

The switches S1 and S1' and the switches S2 and S2' may be switched synchronously to the timing of a first clock CLK1 of FIG. 7 (a) and a second clock CLK2 of FIG. 7 (b), respectively. However, the present invention is not limited thereto.

FIG. 7 is a timing diagram showing each node state of the integrator of FIG. 6 with time.

FIG. 7 (a) shows on-off timings of the switches S1 and S1'.
FIG. 7 (b) shows on-off timings of the switches S2 and S2'.
FIG. 7 (c) illustrates a potential of the second terminal Xi.
FIG. 7 (d) illustrates an output voltage $V_{o1}$ of the first operational amplifier OA1 FIG. 7 (e) illustrates an output voltage $V_{o2}$ of the second operational amplifier OA2.

Referring to FIG. 7 (a) and FIG. 7 (b), the switches S1 and S1' and switches S2 and S2' may be alternately in on-state during non-overlapping time intervals. In other words, the switches S1 and S1' may be in on-state during time intervals [t1, t2] and [t1', t2'] and in off-state during time intervals [t2, t1']. The switches S2 and S2' may be in on-state during time intervals [t3, t4] and [t3', t4'] and in off-state during time intervals [t4, t3']. Operation states of the switches S1 and S1' and switches S2 and S2' during time intervals [t1, t1'] may be repeated continuously. In FIG. 7, time intervals [t2, t3] and [t4, t1'] are not zero, but may be substantially set to be near zero.

Hereinafter in this specification, the time immediately before time t may be referred to as 't−', and the time immediately after time t may be referred to as 't+'. For example, the time immediately before time t1 may be referred to as 't1−', and the time immediately after time t1 may be referred to as 't1+'. Operation of an integrator according to an embodiment of the present invention at each time point of FIG. 7 will be described below with reference to operation state diagrams of the integrator illustrated in FIGS. 8 to 10.

Figure 8:
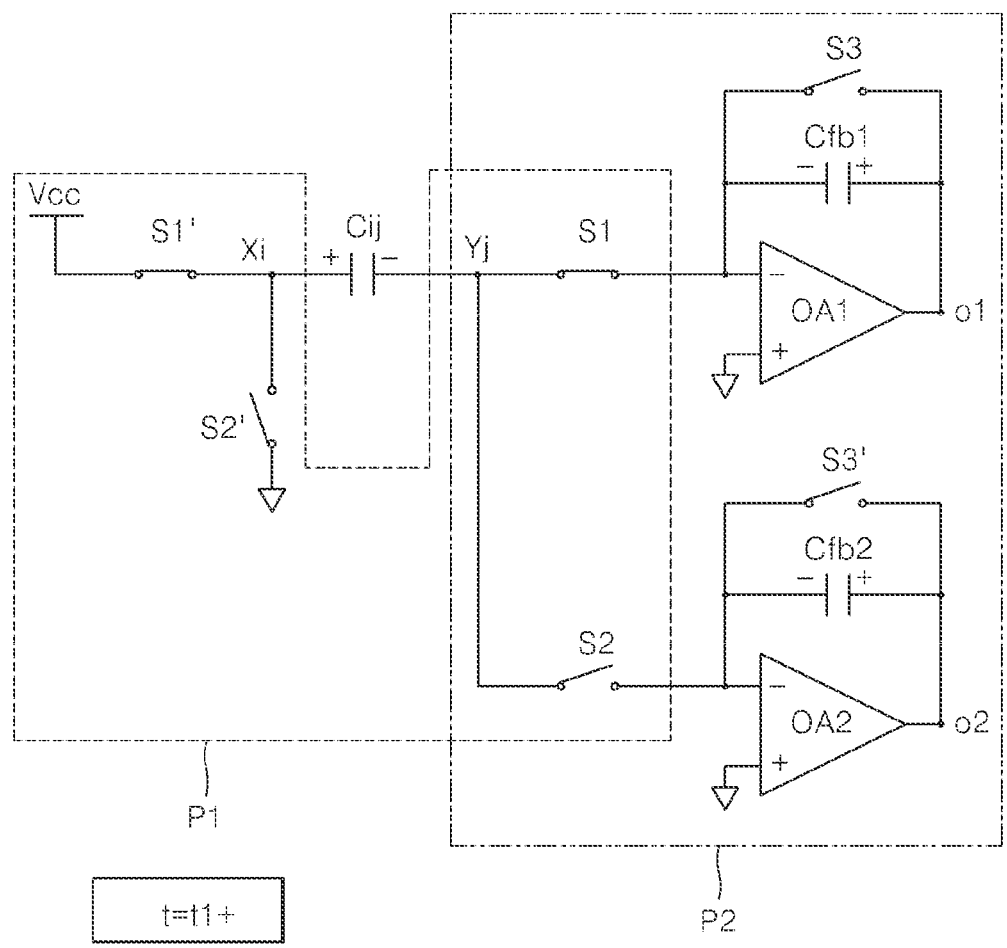
FIGS. 8 to 10 illustrate configurations of integrators according to embodiments of the present invention.
Figure 9:
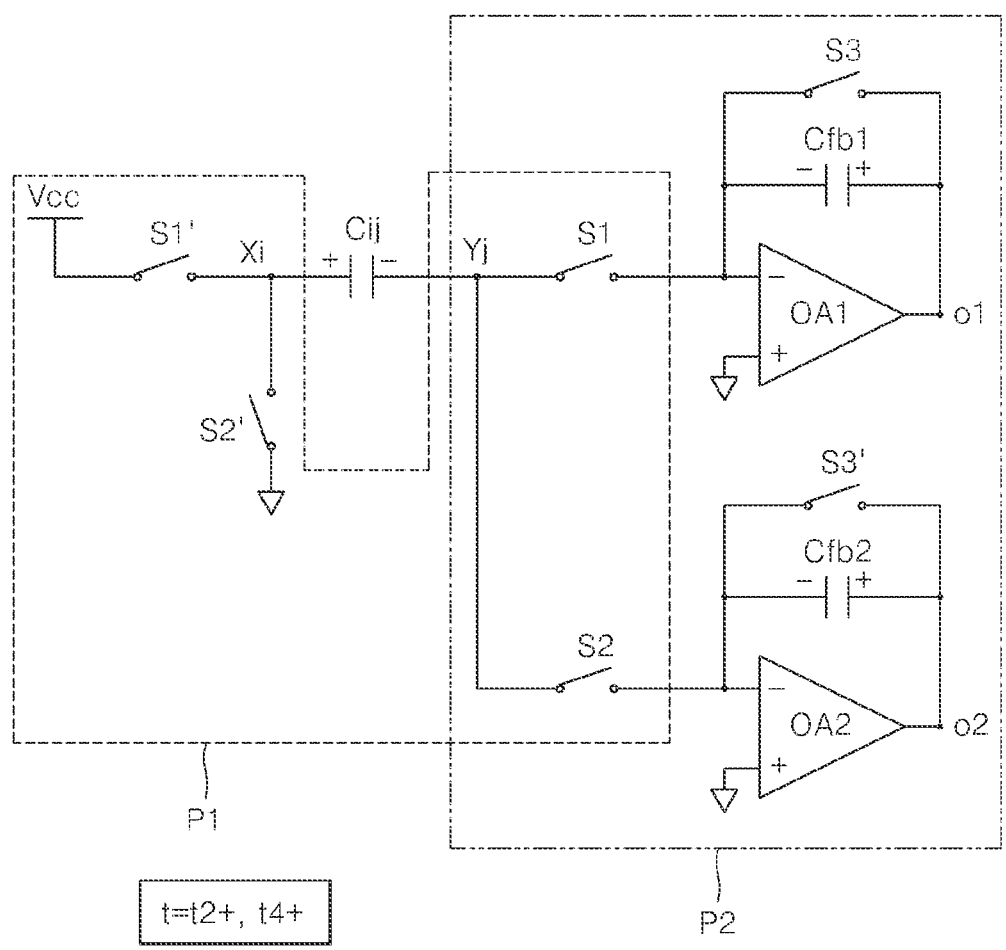
Figure 10:
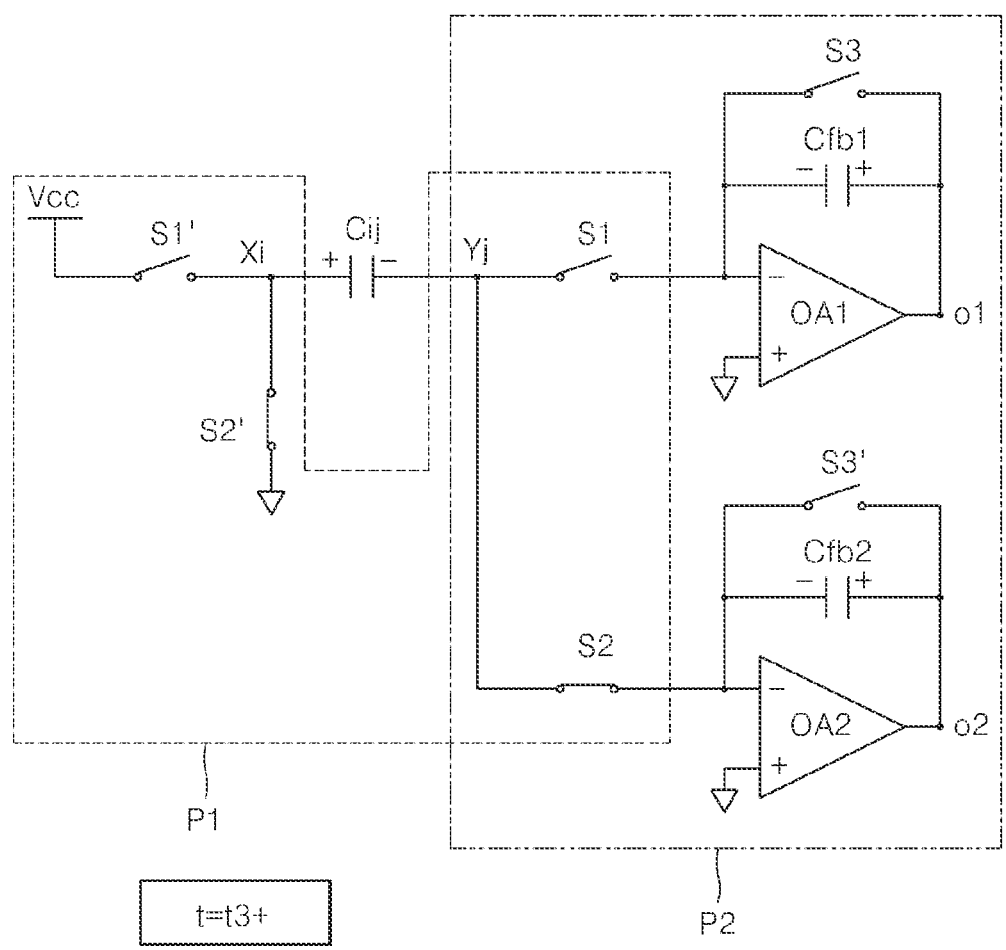

FIGS. 8 to 10 are operation state diagrams illustrating operations of the integrator at time t1+ of FIG. 7, at times t2+ and t4+ of FIG. 7, and at time t3+ of FIG. 7, respectively. At this point, it is assumed that the capacitors $C_{fb1}$, $C_{fb2}$, and $C_{ij}$ are all discharged at time t1−, i.e., the initial condition is zero accumulated electric charges at all capacitors.

Referring to FIGS. 7 and 8, the switches S1 and S1' are in on-state, and the switches S2 and S2' are in off-state at time t1+. The first terminal Yj of the capacitor $C_{ij}$ is connected to the inverting input terminal of the first operational amplifier OA1. Then, since the non-inverting input terminal of the first operational amplifier OA1 is connected to a second potential GND, the potential at the first terminal Yj is the same as the second potential. Since a potential at the second terminal Xi of the capacitor $C_{ij}$ is the first potential $V_{cc}$, a potential difference across both terminals of the capacitor $C_{ij}$ is the same as the first potential $V_{cc}$.

Since the current flowing through the capacitor $C_{ij}$ flows through the first feedback capacitor $C_{fb1}$, the potential $V_{o1,1}$ at an output terminal of the first operational amplifier OA1 is expressed as Equation 1.

$$V_{o1,1} = -V_{cc} \cdot \frac{C_{ij}}{C_{fb1}} \qquad \text{[Equation 1]}$$

The potential at the first terminal Yj is maintained at the second potential GND, and the potential at the output terminal of the second operational amplifier OA2 is also maintained at the second potential GND.

Hereinafter, assuming that one integration cycle is completed by N time integrations, the potential at the output terminal of the first operational amplifier OA1 when k-th integration is just completed after a new integration cycle starts may be indicated as $V_{o1,k}$.

Referring to FIGS. 7 and 9, the switches S1 and S1' are the switches S2 and S2' are all in off-state at time t2+. The potential difference across both terminals of the capacitors $C_{ij}$ is maintained at the same as the first potential $V_{cc}$. At this point, although the first terminal Yj and the second terminal Xi are in floating state, the potential at the first terminal Yj is indicated as the second potential GND in the FIGS. 7C and 7D for convenience.

Referring to FIGS. 7 and 10, the switches S1 and S1' are in off-state, and the switches S2 and S2' are in on-state at time t3+. The potential at the second terminal Xi becomes the second potential GND, and the potential at the first terminal Yj becomes $-V_{cc}$ in a moment. Since the first terminal Yj is connected to the inverting input terminal of the second operational amplifier OA2, the potential at the first terminal Yj promptly rises to the second potential GND. Since a current flows from the output terminal of the second operational amplifier OA2 and charges the second feedback capacitor $C_{fb2}$ during a time interval when the potential at the first terminal Yj changes in a moment, the potential $V_{o2,1}$/at the output terminal o2 of the second operational amplifier OA2 is expressed as Equation 2.

$$V_{o2,1} = +V_{cc} \cdot \frac{C_{ij}}{C_{fb2}} \qquad \text{[Equation 2]}$$

Referring to FIGS. 7 and 9 again, the switches S1 and S1' are the switches S2 and S2' are all in off-state at time t4+. The potential difference across both terminals of the capacitor $C_{ij}$ becomes zero. At this point, the first terminal Yj and the second terminal Xi are in floating state, but the potential at the first terminal Yj is indicated as the second potential GND in the FIGS. 7 (c) and 7 (d) for convenience.

If time interval [t1, t1'] when operations described in FIGS. 8 to 10 are performed is defined as one cycle, the cycle may be repeated N times. During these N time cycles, since the electric charges which are charged in the first feedback capacitor $C_{fb1}$ and second feedback capacitor $C_{fb2}$ are not discharged, the potential $V_{o1}$ of the output terminal o1 of the first operational amplifier OA1 and the potential $V_{o2}$ of the output terminal o2 of the second operational amplifier OA2 step up or down as illustrated in FIGS. 7 (e) and 7 (f), respectively. When N time cycles are completed, the value ΔV which is obtained by subtracting the potential $V_{o1,N}$ from the potential $V_{o2,N}$ may be expressed as Equation 3.

$$\Delta V = V_{o2,N} - V_{o1,N} \quad \text{[Equation 3]}$$
$$= +NV_{cc} \cdot \frac{C_{ij}}{C_{fb}} - \left(-NV_{cc} \cdot \frac{C_{ij}}{C_{fb}}\right)$$
$$= +2NV_{cc} \cdot \frac{C_{ij}}{C_{fb}}$$

In this case, it is assumed that the first feedback capacitor $C_{fb1}$ and the second feedback capacitor $C_{fb2}$ have the same value $C_{fb}$.

Referring to Equation 3, since the value $C_{fb}$ of the first feedback capacitor and the second feedback capacitor may have a constant value, it can be seen that the value ΔV is proportional to the value of capacitor $C_{ij}$.

When the integrator of FIG. 6 is applied to a touch screen driving circuit, the capacitance of the capacitor $C_{ij}$ may be measured as measuring the value d V because the value of the capacitor $C_{ij}$ changes according to the presence of a touch input, and thus, it can be determined whether a touch has been input.

After N time integration cycles are completed and the value ΔV is measured, the reset switches S3 and S3' may be changed to on-state to discharge all the electric charges of the first feedback capacitor and the second feedback capacitor. In this way, if the time taken in N time charging/discharging of the capacitor $C_{ij}$ is defined as one integration cycle, a new integration cycle may start again after the reset switches S3 and S3' are changed to on-state.

Up to now, operations of the integrator according to an embodiment of the present invention have been described with reference to FIGS. 6 to 10. As described in FIG. 5, however, noise may flow into the first terminal Yj of the integrator.

For example, when the integrator is used as the touch screen driving circuit, noise may flow into the touch screen driving circuit through the first terminal Yj. In other words, the above mentioned sensing pattern 100 may correspond to the first terminal Yj of the capacitor $C_{ij}$. Noise may flow into the first terminal Yj when an object such as a finger is put near the sensing pattern 100 for touch input.

According to an embodiment of the present invention in FIG. 6, the noise input can be efficiently cancelled. Hereinafter, the principle of cancellation will be described with reference to FIGS. 11 to 14.

FIGS. 11 to 14 are diagrams illustrating a principle of cancelling the noise input to the integrator according to an embodiment of the present invention.

Basically, the noise input through the first terminal Yj may be integrated to be added to the output voltages of the first operational amplifier OA1 and the second operational amplifier OA2. The first operational amplifier OA1 integrates the noise only when the switches S1 and S1' are in on-state, while the second operational amplifier OA2 integrates the noise only when the switches S2 and S2' are in on-state.

Figure 11:
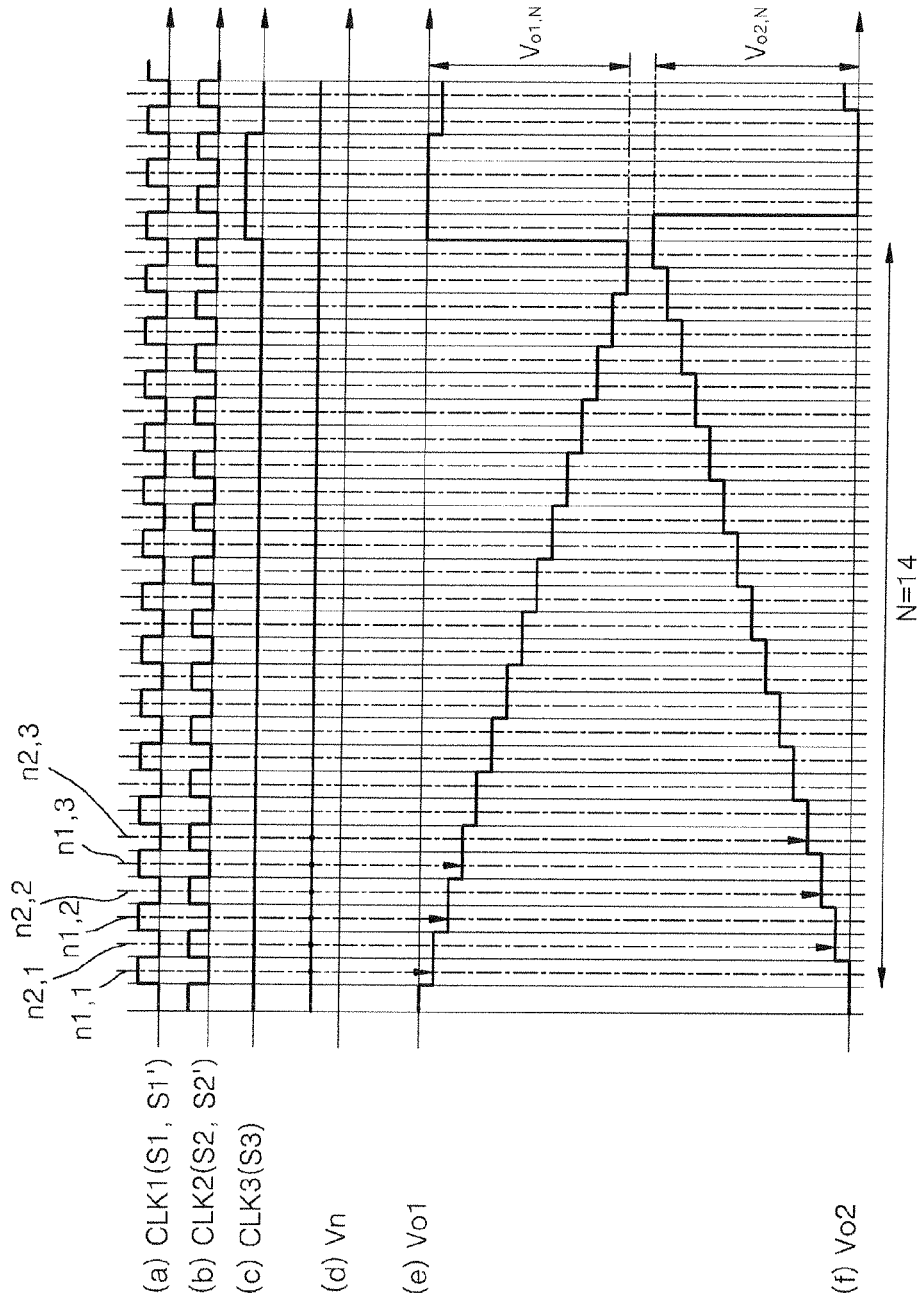
FIGS. 11 to 14 are diagrams for describing a principle of cancelling noise which may be input to an integrator according to embodiments of the present invention.

FIG. 11 illustrates when noise which has only a DC component is input.

Referring to FIG. 11, noises input during on-intervals including time point n1,k (k=1, 2, 3, ..., N) in the first clock CLK1 are integrated to be added to the output potential $V_{o1}$ of the first operational amplifier OA1. If a magnitude of the noise that is integrated to be added to the output potential $V_{o1}$ during each on-interval is defined as $A_{1,nk}$ (k=1, 2, 3, ..., N), the magnitude $A_1$ of the noise that is integrated to be added to the output potential $V_{o1}$ of the first operational amplifier OA1 during one integration cycle may be expressed as Equation 4.

$$A_1 = A_{1,n1} + A_{1,n2} + A_{1,n3} + \ldots A_{1,nN} \quad \text{[Equation 4]}$$

Likewise, noises input during on-intervals including time point n2,k (k=1, 2, 3, ..., N) in the second clock CLK2 are integrated to be added to the output potential $V_{o2}$ of the second operational amplifier OA2. If a magnitude of the noise that is integrated to be added to the output potential $V_{o2}$ during each on-interval is defined as $A_{2,nk}$ (k=1, 2, 3, ..., N), the magnitude $A_2$ of the noise that is integrated to be added to the output potential $V_{o2}$ of the second operational amplifier OA2 during one integration cycle may be expressed as Equation 5.

$$A_2 = A_{2,n1} + A_{2,n2} + A_{2,n3} + \ldots A_{2,nN} \quad \text{[Equation 5]}$$

Considering the effect of the integrated noise together, Equation 3 may be changed to Equation 6. In other words, the value ΔV which is obtained by subtracting the potential $V_{o1,N}$ from the potential $V_{o2,N}$ after N time cycles are completed may be expressed as Equation 6.

$$\Delta V = +2NV_{cc} \cdot \frac{C_{ij}}{C_{fb}} + A_2 - A_1 \quad \text{[Equation 6]}$$
$$= +2NV_{cc} \cdot \frac{C_{ij}}{C_{fb}} + \sum_{k=1}^{N}(A_{2,nk} - A_{1,nk})$$

Then, when noise has only a DC component, since the equation $A_{2,nk} = A_{1,nk}$ is substantially satisfied, Equation 6 may be expressed as Equation 7.

$$\Delta V = +2NV_{cc} \cdot \frac{C_{ij}}{C_{fb}} + A_2 - A_1 \quad \text{[Equation 7]}$$
$$= +2NV_{cc} \cdot \frac{C_{ij}}{C_{fb}} + \sum_{k=1}^{N}(A_{2,nk} - A_{1,nk})$$
$$= +2NV_{cc} \cdot \frac{C_{ij}}{C_{fb}}$$

Accordingly, noise which has only a DC component can be removed using the integrator according to an embodiment of the present invention.

Figure 12:
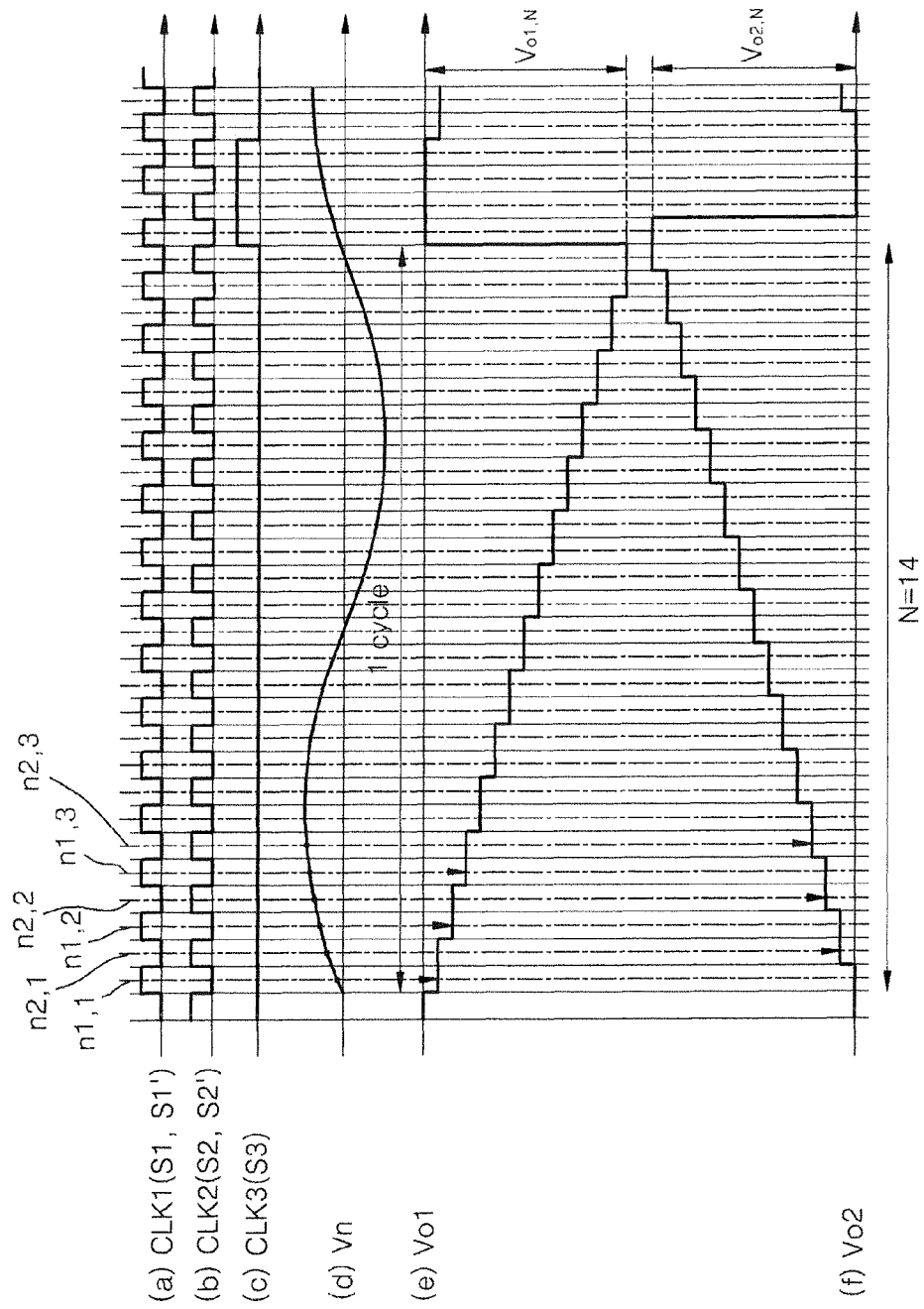

FIG. 12 illustrates the operation of an embodiment of the present invention when low frequency noise input is provided.

Operation periods and operation frequencies of the first clock CLK1 and the second clock CLK2 may be referred to as T and f (=1/T), respectively. FIG. 12 illustrates when a period of noise is very long compared to the operation period T. In this case, the integrated number N for every integration cycle is equal to 14 in the integrator circuit, while noise travels only by one cycle for every integration cycle.

In FIG. 12, the value ΔV which is obtained by subtracting the potential $V_{o1,N}$ from the potential $V_{o2,N}$ may be also expressed as Equation 6. When noise has no DC component as illustrated in FIG. 12, the equation $A_{2,nk} = A_{1,nk}$ is not satisfied in Equation 6, but the magnitude $A_1$ of the noise that is integrated to be added to the output potential $V_{o1}$ of the first operational amplifier OA1 may almost offset the magnitude $A_2$ of the noise that is integrated to be added to the output potential $V_{o2}$ of the second operational amplifier OA2 ($\Sigma_{k=1}^{N}$ $(A_{2,nk}-A_{1,nk})\cong 0$. Accordingly, noise having much lower frequency than operation frequencies of the first and second clocks affects hardly the value $\Delta V$.

Figure 13:
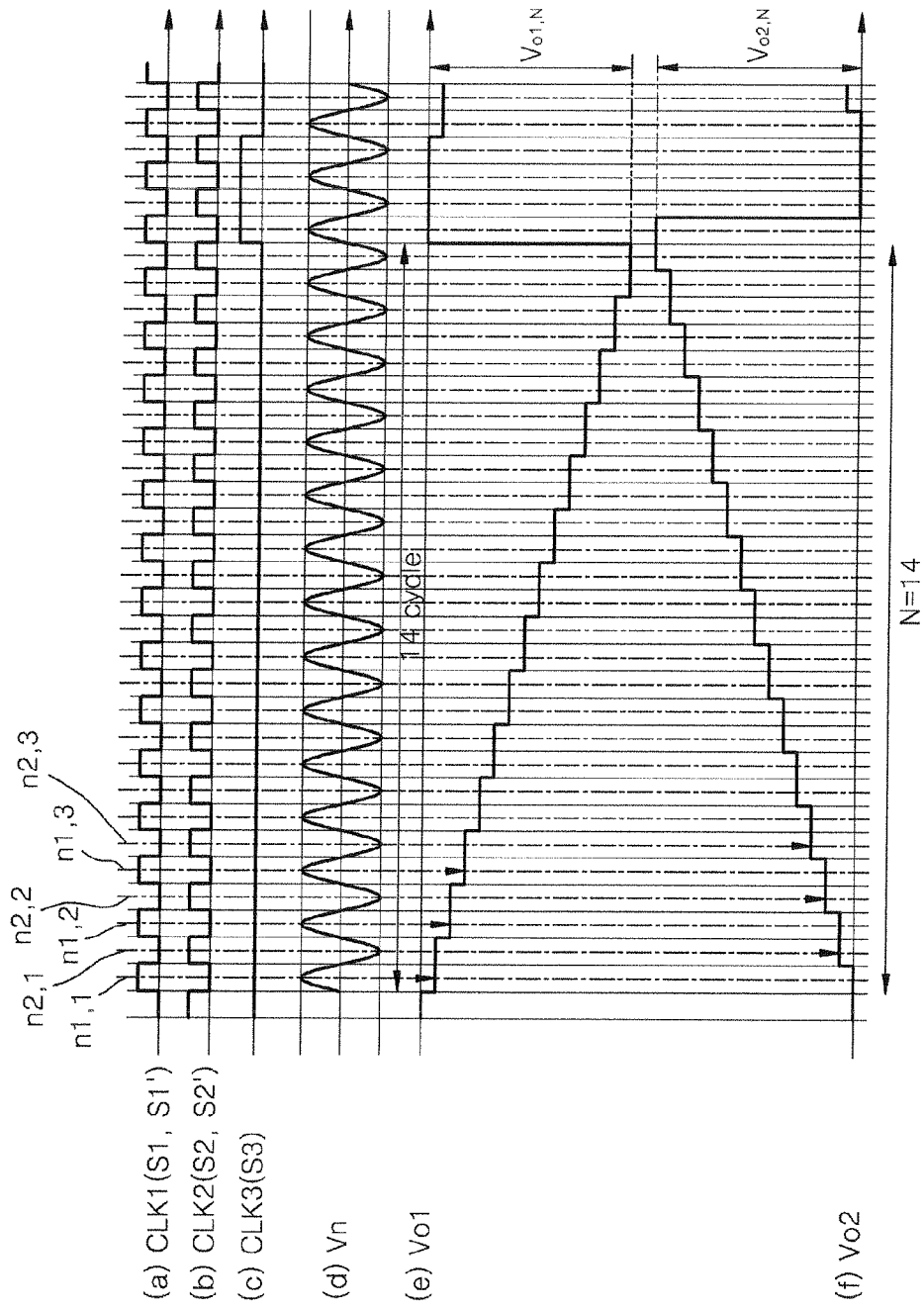

FIG. 13 is a diagram illustrating when noise having the same frequency as operation frequencies of the first clock CLK1 and second clock CLK2 is input. In other words, an integrated number N for every integration cycle is equal to 14 in the integrator circuit, and the cycle of noise is repeated 14 times for every integration cycle as well.

In FIG. 13, the value $\Delta V$ which is obtained by subtracting the potential $V_{o1,N}$ from the potential $V_{o2,N}$ may be also expressed as Equation 6. The magnitude $A_{2,nk}$ of the noise, which is integrated to be added to the output potential $V_{o2}$ of the second operational amplifier OA2 during the interval including time point n2,k in the second clock CLK2, is the same as the magnitude $A_{1,nk}$ of the noise, which is integrated to be added to the output potential $V_{o1}$ of the first operational amplifier OA1 during the interval including time point n1,k in the first clock CLK1. However, the sign of the noise which is integrated to be added to the output potential $V_{o2}$ is the opposite of the sign of the noise which is integrated to be added to the output potential $V_{o1}$. In other words, the equation $A_{2,nk}=-A_{1,nk}$ is established. Accordingly, Equation 6 may be expressed as Equation 8 for the case of FIG. 13.

$$\Delta V = +2NV_{cc} \cdot \frac{C_{ij}}{C_{fb}} + A_2 - A_1 \quad [\text{Equation 8}]$$
$$= +2NV_{cc} \cdot \frac{C_{ij}}{C_{fb}} + \sum_{k=1}^{N}(A_{2,nk}-A_{1,nk})$$
$$= +2NV_{cc} \cdot \frac{C_{ij}}{C_{fb}} + 2A_2$$

As a result, the noise of FIG. 13 is not removed.

Figure 14:
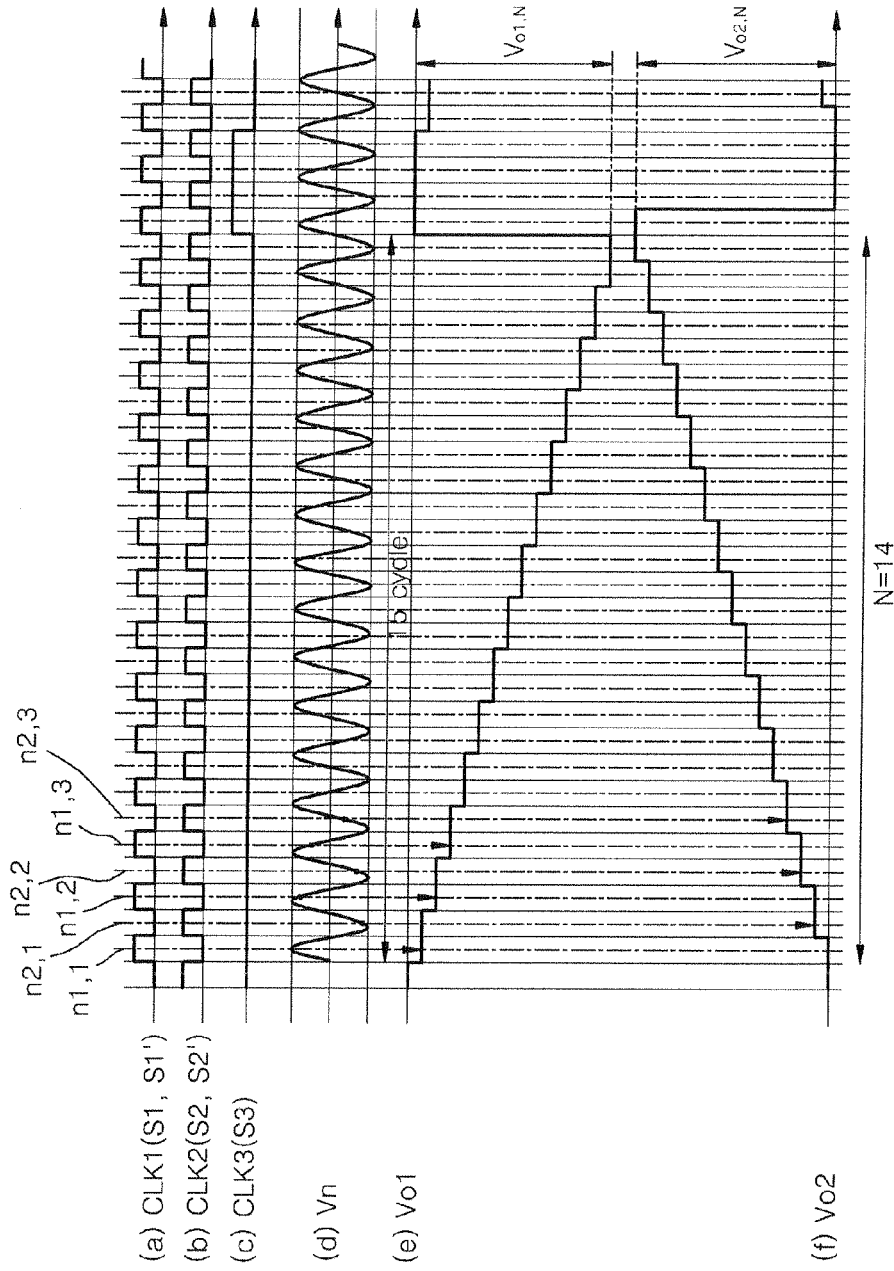

FIG. 14 is a diagram illustrating the integrated number N for every integration cycle is equal to 14 in the integrator circuit, and the cycle of noise is repeated 15 times for every integration cycle.

In FIG. 14, the value $\Delta V$ which is obtained by the potential $V_{o1,N}$ from the potential $V_{o2,N}$ may be also expressed as Equation 6. In the case of FIG. 14, the equation $A_{2,nk}=A_{1,nk}$ is not satisfied for Equation 6, but the magnitude $A_1$ of the noise that is integrated to be added to the output potential $V_{o1}$ of the first operational amplifier OA1 may almost offset the magnitude $A_2$ of the noise that is integrated to be added to the output potential $V_{o2}$ of the second operational amplifier OA2 ($\sum_{k=1}^{N}(A_{2,nk}-A_{1,nk})\cong 0$). On the assumption of that the integrated number N for every integration cycle is N, when sinusoidal wave noise having a cycle that is repeated k (k is a non-negative integer except N) times at every integration cycle is input through the terminal Yj, the noise can be substantially removed by using the integration circuit according to an embodiment of the present invention.

Figure 15:
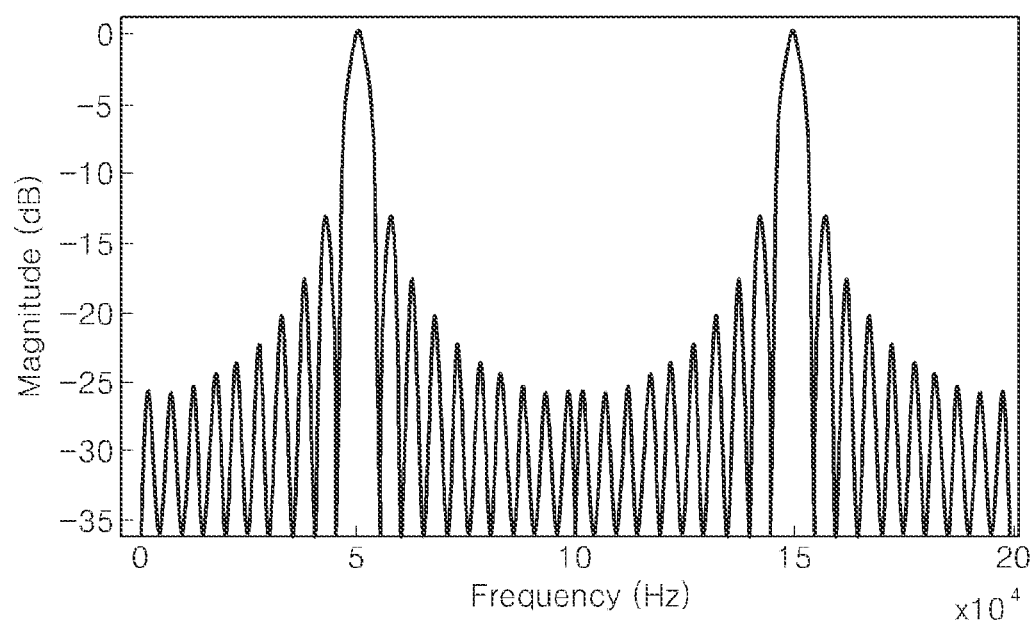
FIG. 15 illustrates a frequency response to noise of an integrator according to an embodiment of the present invention.

FIG. 15 illustrates a frequency response of the circuit area P2 where the input of the circuit area P2 is defined as the potential of first terminal Yj of FIG. 6 and the output of the circuit area P2 is defined as the value which is obtained by subtracting the potential $V_{o1}$ at the output terminal of the first operational amplifier OA1 from the potential $V_{o2}$ at the output terminal of the second operational amplifier OA2. FIG. 15 illustrates the noise removing property according to an embodiment of the present invention in frequency domain, while FIGS. 11 to 14 illustrate the noise removing property in time domain.

FIG. 15 illustrates an example when the integrated number N for an integration cycle is equal to 10. Referring to FIG. 15, it can be seen that the number of frequency points of null response are 10, including DC frequency under the peak frequency 50,000 Hz in the frequency response curve.

As understood with reference to FIG. 15, when the driving frequency f is set high enough, since the noise pass-band of the circuit area P2 of FIG. 6 is separated with large frequency gap from the critical noise bands frequently occurring in the environments, it is beneficial to remove such noises. HUM noise with more than 100V and its harmonics are an example of the critical noises.

For the case when Equation 6 is satisfied as above, the value of capacitor $C_{ij}$ can be calculated from Equation 6, as expressed in Equation 9.

$$C_{ij} = \frac{\Delta V \cdot C_{fb}}{2NV_{cc}} \quad [\text{Equation 9}]$$

When the value of capacitor $C_{ij}$ has been changed, whether a touch event has been occurred may be determined.

Hereinafter, it will be described that the circuit of FIG. 6 according to an embodiment of the present invention is configured to include an inverting integrator circuit and a non-inverting integrator circuit.

Figure 16:
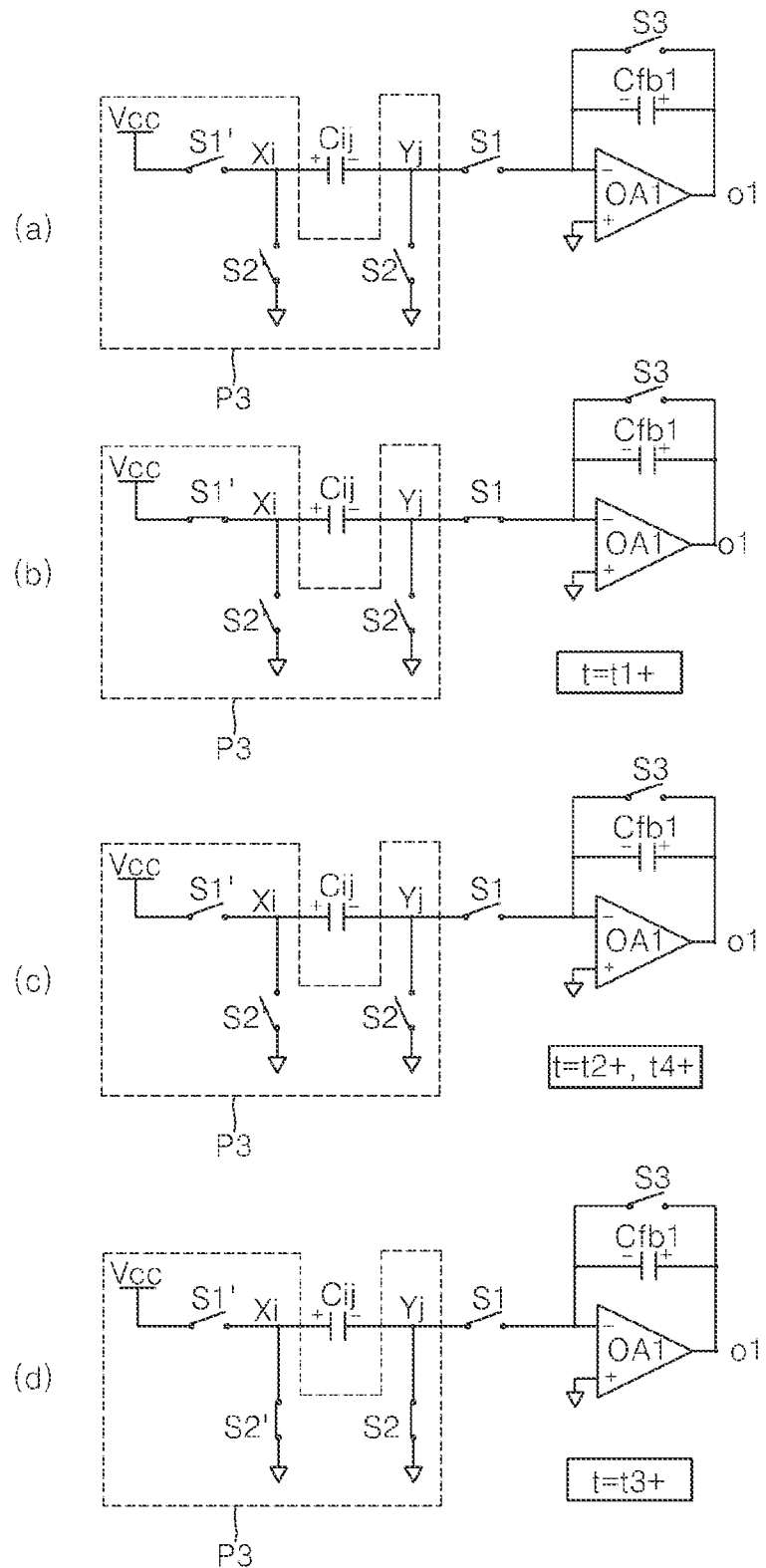
FIG. 16 illustrates an example of an inverting integrator circuit usable to an embodiment of the present invention.

FIG. 16 illustrates an example of the inverting integrator circuit usable to an embodiment of the present invention. FIG. 16 (a) illustrates a circuit in which the second operational amplifier OA2 is removed from the circuit illustrated in FIG. 6. It can be understood that the circuit of FIG. 6 includes the substantially same inverting integrator circuit as that of FIG. 16 (a) in that the switch S2 of FIG. 6 is connected to the second potential GND through the inverting input and non-inverting input of the second operational amplifier OA2 while the switch S2 of FIG. 16 (a) is directly connected to the second potential GND.

FIGS. 16 (b), (c) and (d) illustrate the operation states at time t1+, t2+ and t4+, and t3+, respectively, when the inverting integrator circuit of FIG. 16 (a) has the switching timing according to the first clock CLK1 and the second clock CLK2 of FIG. 7 or FIG. 11. It can be also seen that the circuit of FIG. 6 includes the substantially same inverting integrator circuit as that of FIG. 16, comparing FIGS. 16 (b), (c), and (d) with FIGS. 8, 9, and 10, respectively.

The circuit of FIG. 16 may be referred to as an inverting switched capacitor integrator circuit.

Figure 17:
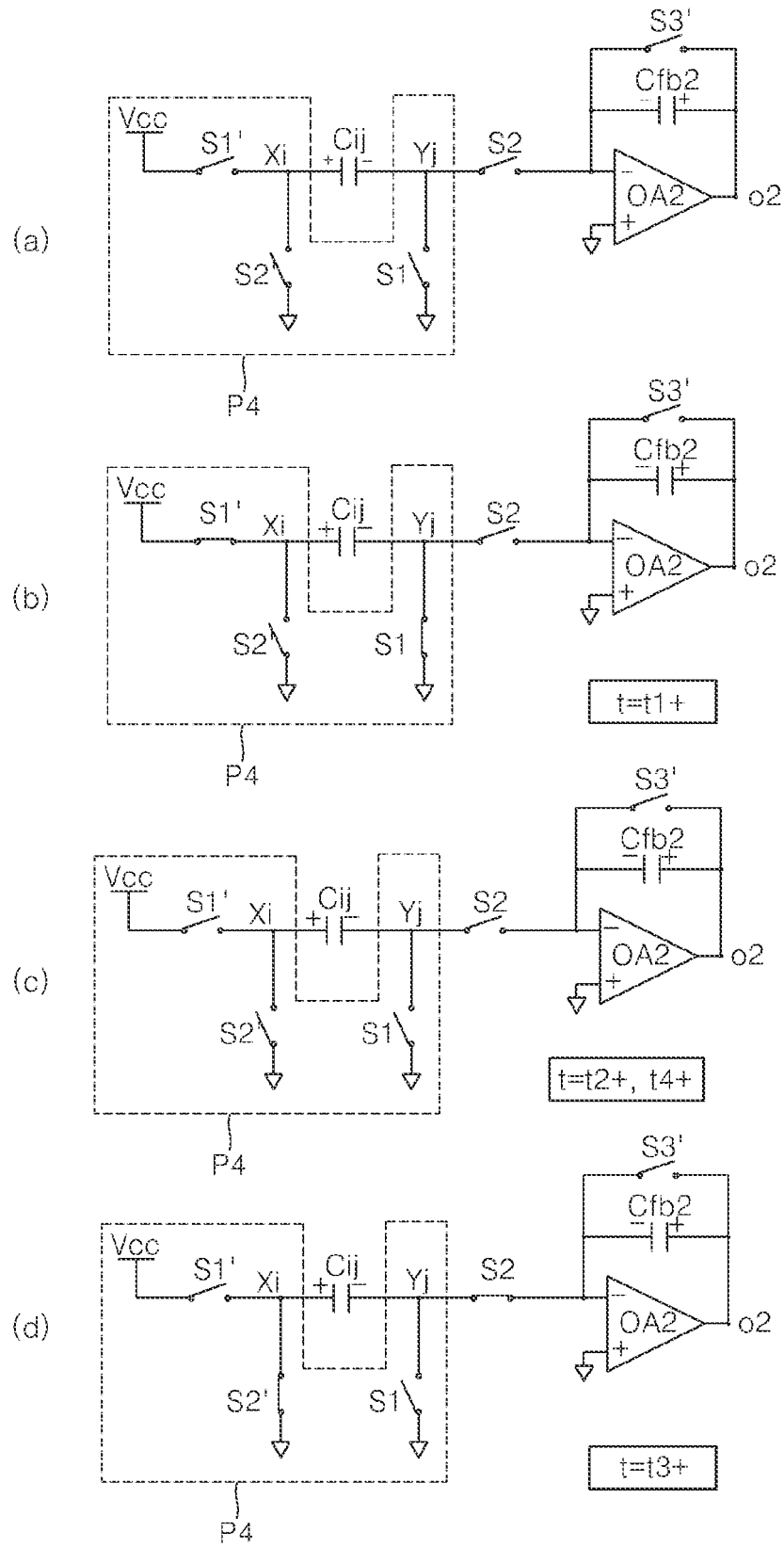
FIG. 17 illustrates an example of a non-inverting integrator circuit usable to an embodiment of the present invention.

FIG. 17 illustrates an example of a non-inverting integrator circuit usable to an embodiment of the present invention. FIG. 17 (a) illustrates a circuit in which the first operational amplifier OA1 is removed from the circuit of FIG. 6. It can be understood that the circuit of FIG. 6 includes the substantially same non-inverting integrator circuit as that of FIG. 17 in that the switch S1 of FIG. 6 is connected to the second potential GND through the inverting input terminal and the non-inverting input terminal of the first operational amplifier OA1 while the switch S1 of FIG. 17 (a) is directly connected to the second potential GND.

FIGS. 17 (b), (c) and (d) illustrate the operation states at time t1+, t2+ and t4+, and t3+, respectively, when the non-inverting integrator circuit of FIG. 17 (a) has switching timing according to the first clock CLK1 and the second clock CLK2 of FIG. 7 or FIG. 11. It can be also seen that the circuit of FIG. 6 includes the substantially same non-inverting integrator circuit as that of FIG. 17, comparing FIGS. 17 (b), (c), and (d) with FIGS. 8, 9, and 10, respectively.

The circuit of FIG. 17 may be referred to as a non-inverting switched capacitor integrator circuit.

To provide a summary on FIGS. 6, 16, and 17, the integrator circuit according to an embodiment of the present invention is obtained by coupling a non-inverting integrator circuit and an inverting integrator circuit that shares the capacitor $C_{ij}$ and a charge/discharge circuit for charging/discharging the capacitor $C_{ij}$.

The charge/discharge circuit may correspond to the circuit area P1 of FIG. 6, the circuit area P3 of FIG. 16, and the circuit area P4 of FIG. 17.

Figure 18:
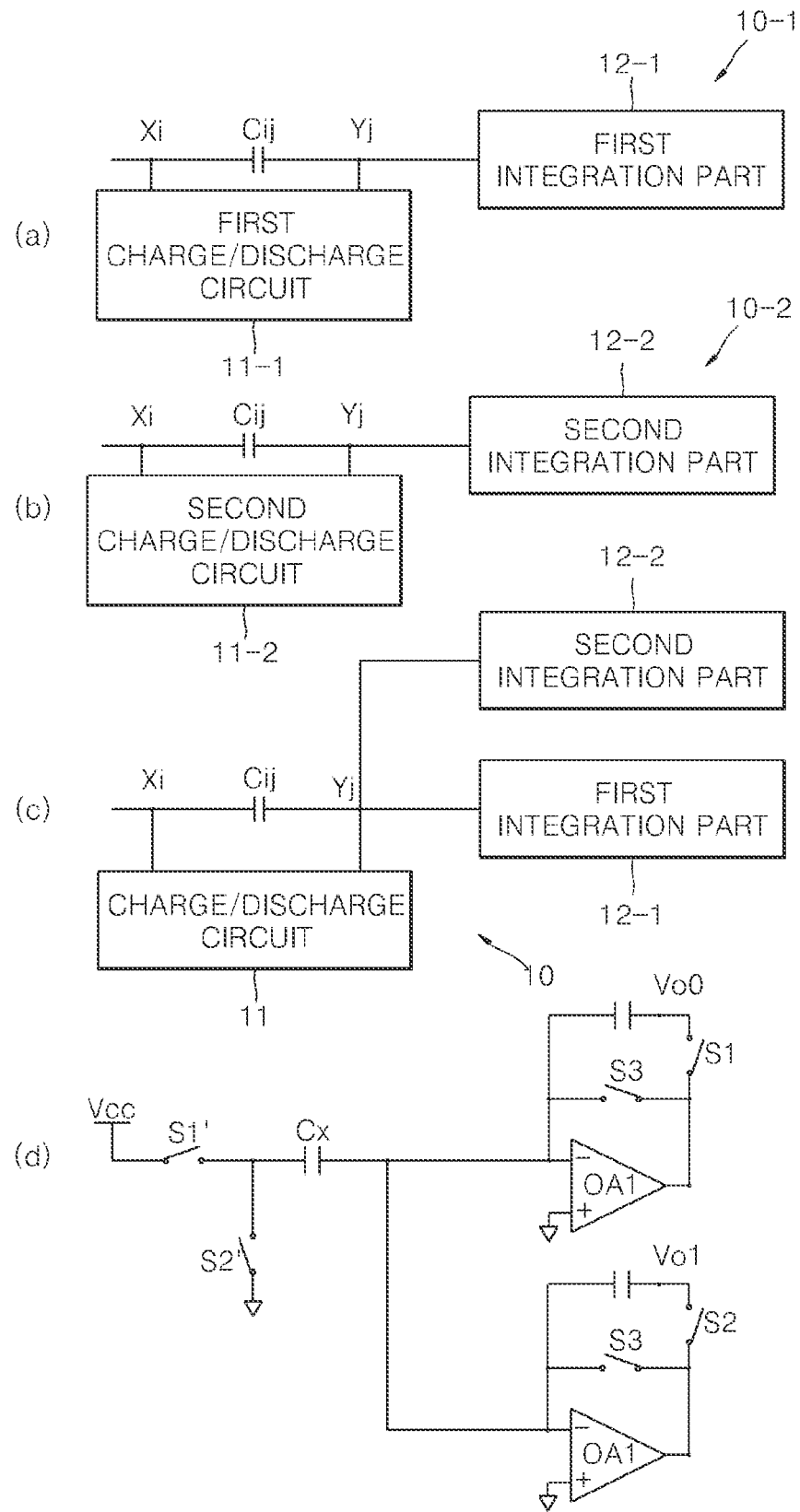
FIGS. 18 and 19 illustrate an integrator circuit according to another embodiment of the present invention.

FIG. 18 illustrates an integrator circuit according to another embodiment of the present invention.

FIG. 18 (a) illustrates that the integrator circuit of FIG. 16 can be described as an integration of circuit modules, such as a first charge/discharge circuit 11-1 and a first integration part 12-1. The first charge/discharge circuit 11-1 corresponds to the circuit area P3 of FIG. 16, and the first integration part 12-1 corresponds to the combination of the first operational amplifier OA1, the first feedback capacitor $C_{fb1}$, and the third switch S3 of FIG. 16.

FIG. 18 (b) illustrates that the integrator circuit of FIG. 16 can be described as an integration of circuit modules, such as a second charge/discharge circuit 11-2 and a second integration part 12-2. The second charge/discharge circuit 11-2 corresponds to the circuit area P4 of FIG. 17, and the second integration part 12-2 corresponds to the combination of the second operational amplifier OA2, the second feedback capacitor $C_{fb2}$, and the third switch S3' of FIG. 17.

FIG. 18 (c) may be obtained by integrating the circuits of FIG. 18 (a) and FIG. 18 (b). A charge/discharge circuit 11 corresponds to the circuit area P1 of FIG. 6, the first integration part 12-1 corresponds to the combination of the first operational amplifier OA1, the first feedback capacitor $C_{fb1}$, and the third switch S3 of FIG. 6, and the second integration part 12-2 corresponds to the combination of the second operational amplifier OA2, the second feedback capacitor $C_{fb2}$, and the third switch S3' of FIG. 6.

Figure 19:
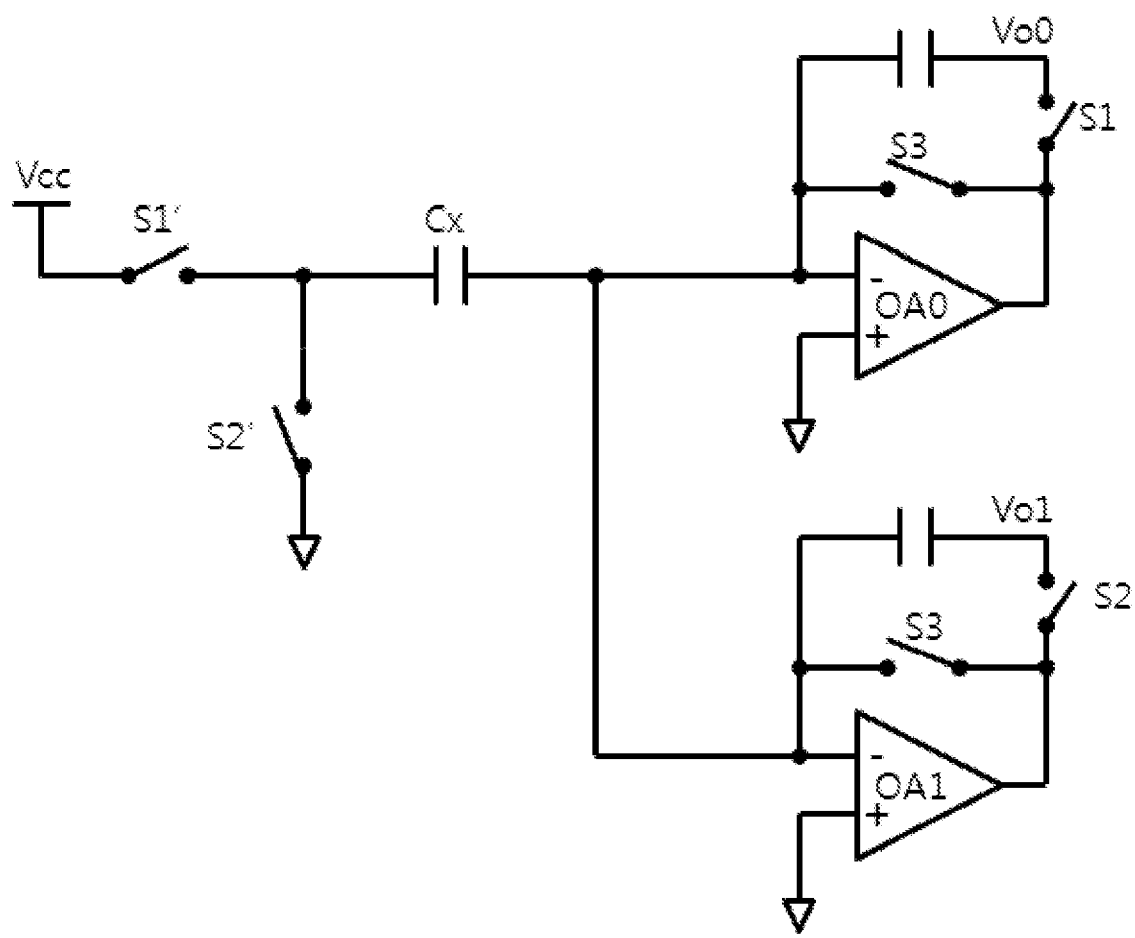

FIG. 19 illustrates an integrator circuit according to another embodiment of the present invention.

The circuit illustrated in FIG. 19 implements the circuit of FIG. 18 (c), which is an embodiment of the present invention, in a method manner compared with that of FIG. 6. However, it can be easily understood that the circuit performs the same operations as that of FIG. 6 when switches S1 and S1' and switches S2 and S2' are driven by the first clock CLK1 and the second clock CLK2 of FIG. 8 or FIG. 11.

In FIGS. 6 and 19, the switch S1 is disposed in the circuit to separate the first operational amplifier OA1 from the capacitor $C_{ij}$ when the switch S2' is in on-state. In contrast, the switch S2 is disposed in the circuit to separate the second operational amplifier OA2 from the capacitor $C_{ij}$ when the switch S1' is in on-state.

FIGS. 16 and 17 illustrate an example of inverting amplifier and non-inverting amplifier. In spite of not being disclosed in the description, it will be understood that an integrator circuit having the configuration of FIG. 18 is obtained by coupling an inverting amplifier and non-inverting amplifier having a different configuration. Accordingly, the spirit and scope of the present invention is not limited to the specific circuit disclosed in the description.

Figure 20:
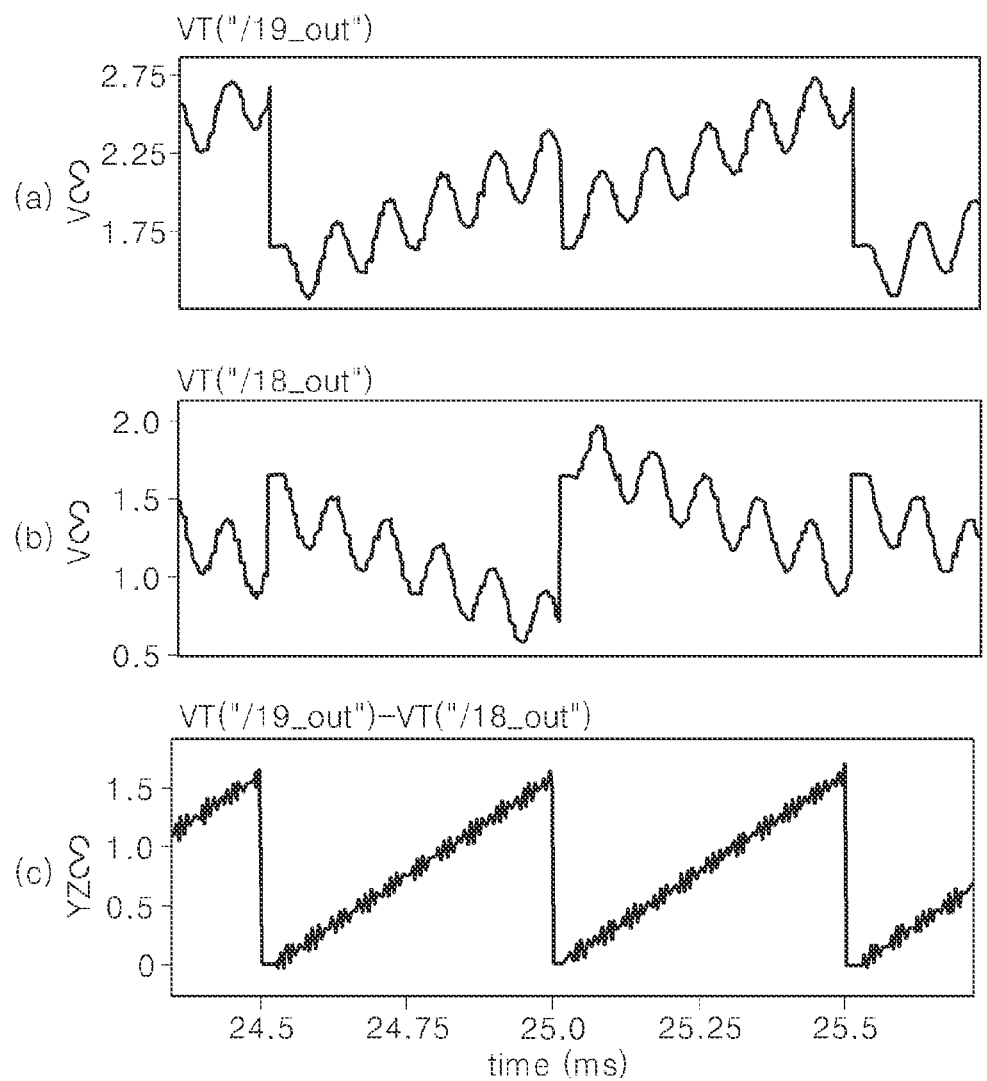
FIG. 20 shows a simulation result about operations of the integrator according to an embodiment of the present invention.

FIG. 20 shows the value $\Delta V$ that is output as a result of performing the simulation in which the first clock CLK1 and the second clock CLK2 of FIG. 11 are applied to the circuit of FIG. 6, and noise is applied to the first terminal Yj. In such a noisy environment, the potential $V_{o1,N}$ at the output terminal o1 of the first operational amplifier OA1 may be expressed as Equation 10, and the potential $V_{o2,N}$ at the output terminal o2 of the second operational amplifier OA2 may be expressed as Equation 11. Then, the values of the first feedback capacitor $C_{fb1}$ and second feedback capacitor $C_{fb2}$ may be set as the same value $C_{fb}$.

$$V_{o1,N} = -NV_{cc} \cdot \frac{C_{ij}}{C_{fb}} + \sum_{k=1}^{N} A_{1,nk} \qquad \text{[Equation 10]}$$

$$V_{o2,N} = +NV_{cc} \cdot \frac{C_{ij}}{C_{fb}} + \sum_{k=1}^{N} A_{2,nk} \qquad \text{[Equation 11]}$$

FIG. 20 (a) shows the potential $V_{o1}$ at the output terminal o1 of the first operational amplifier OA1 with time. FIG. 20 (b) shows the potential $V_{o2}$ at the output terminal o2 of the second operational amplifier OA2 with time. FIG. 20 (c) shows a value which is obtained by subtracting the potential $V_{o1}$ from the potential $V_{o2}$.

In FIG. 20, input noise is similar to a sine wave of which cycle is repeated about 5 to 6 times at every integration cycle. Then, the integrated number N during one integration cycle is set to a value considerably greater than 5 to 6. According to the configuration of an embodiment of the present invention, it can be seen that a noise-removed wave form can be obtained as shown in FIG. 20 (c).

When only one integrator, among an inverting integrator and non-inverting integrator, is used instead of using the circuit configuration in which both integrators are coupled according to the present invention, only the output voltage of Equation 10 or Equation 11 may be obtained. For example, when the output voltage of Equation 10 is obtained, the value of the capacitor $C_{ij}$ may be expressed as Equation 12.

$$C_{ij} = \left(-\frac{C_{fb}}{NV_{cc}}\right) \cdot \left(V_{o1} - \sum_{k=1}^{N} A_{1,nk}\right) \qquad \text{[Equation 12]}$$

Then, the value of the capacitor $C_{ij}$ may not be correctly measured due to the error value according to noise.

The circuit configuration of the present invention may be applied to other application that can use the spirit of the present invention as well as a touch screen. Accordingly, it will be understood that applications of the present invention are not limited to a touch screen driving circuit.

In the present invention, an operational amplifier represents an example of a differential amplifier. An operational amplifier of the present invention may be replaced with a differential amplifier.

The capacitance measuring circuit according to an embodiment of the present invention is configured using a switched capacitor that includes switches, feedback capacitors (integration capacitors), and operational amplifiers, to basically have properties of a finite impulse response (FIR) filter.

In FIGS. 6, 8, 9, 10, 16, 17, and 19 of the accompanying drawings, it is shown that the non-inverting terminal of each operational amplifier is connected to the same potential of ground voltage GND that may be connected to the driving signal line Xi through the switch S2'. However, it can be understood that even if the non-inverting terminal of each operational amplifier is connected to another voltage that is different from the ground voltage GND, the effects according to the above described embodiments of the present invention can be obtained.

The present invention can provide a noise-robust integrator circuit. Also, an input sensing error due to a noise generated from a touch input can be significantly reduced by applying the noise-robust integrator circuit to a sensor block for sensing a touch screen input.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An integrator circuit, comprising:
    a first operational amplifier; a second operational amplifier; a first reset switch; a second reset switch; and a capacitor,
    wherein inverting input terminals of the first and second operational amplifiers are configured to be connected to a first terminal of the capacitor through a first switch and a second switch, respectively,
        a second terminal of the capacitor is configured to be connected to a first potential and a second potential through a third switch and a fourth switch, respectively,
        a first inverting input terminal and a first output terminal of the first operational amplifier are configured to be connected to each other through a first feedback capacitor, a second inverting input terminal and an output terminal of the second operational amplifier are configured to be connected to each other through a second feedback capacitor,
        non-inverting input terminals of the first and second operational amplifiers are configured to be connected to a third potential, and
        a voltage difference between the first output terminal and the second output terminal is provided as an output of the integrator circuit,
        the first inverting input terminal and the first output terminal being configured to be connected to each other through the first reset switch,
        the second inverting input terminal and the second output terminal being configured to be connected to each other through the second reset switch, and
        wherein both of the first reset switch and the second reset switch being configured to be in an off-state during an integration cycle, and to be in an on-state during a predetermined period between two integration cycles.

2. The integrator circuit of claim 1, wherein the first switch and the third switch are driven by a first clock, and the second switch and the fourth switch are driven by a second clock.

3. The integrator circuit of claim 2, wherein on-intervals of the first clock and the second clock are alternately represented on the time axis.

4. The integrator circuit of claim 1, wherein the capacitor is formed by a sensing pattern and a driving pattern formed in a capacitive type touch screen.

5. The integrator circuit of claim 4, wherein one of both terminals of the capacitor corresponds to the sensing pattern, the one of the both terminals being connected to the first operational amplifier and second operational amplifier.

6. The integrator circuit of claim 5, wherein the sensing pattern is disposed at outer side of the touch screen compared to the driving pattern.

7. The integrator circuit of claim 1, wherein one of both terminals of the capacitor connected to the first and second operational amplifiers is an in-flowing path of noise input by cable or wireless.

8. The integrator circuit of claim 1, wherein the second potential is the same as the third potential.

9. An input sensing circuit of a capacitive type touch screen where a sensing pattern and a driving pattern are formed, the input sensing circuit comprising:
    a first operational amplifier;
    a second operational amplifier;
    a first reset switch; and
    a second reset switch,
    wherein the sensing pattern is configured to be connected to a first inverting input terminal of the first operational amplifier through a first switch and connected to a second inverting input terminal of the second operational amplifier through a second switch, respectively,
    the driving pattern is configured to be connected to a first potential and a second potential through a third switch and a fourth switch, respectively,
    the first inverting input terminal and a first output terminal of the first operational amplifier are configured to be connected to each other through a first feedback capacitor, and the second inverting input terminal and a second output terminal of the second operational amplifier are configure to be connected to each other through a second feedback capacitor, and
    non-inverting input terminals of the first and second operational amplifiers are connected to a third potential, and
    a voltage difference between the first output terminal of the first operational amplifier and the second output terminal of the second operational amplifier is provided as an output of the input sensing circuit,
    the first inverting input terminal and the first output terminal being configured to be connected to each other through the first reset switch,
    the second inverting input terminal and the second output terminal being configured to be connected to each other through the second reset switch, and
    wherein both of the first reset switch and the second reset switch are configured to be in an off-state during an integration cycle, and to be in an on-state during a predetermined period between two integration cycles.

10. The input sensing circuit of claim 9, wherein the first switch and the third switch are driven by a first clock, and the second switch and the fourth switch are driven by a second clock.

11. The input sensing circuit of claim 9, wherein the second potential is the same as the third potential.

12. A switched capacitor integrator circuit, comprising:
    an inverting switched capacitor integrator circuit, having a first reset switch; and
    a non-inverting switched capacitor integrator circuit connected to the inverting switched capacitor integrator circuit, having a second reset switch,
    wherein a sampling capacitor of the inverting switched capacitor integrator circuit is shared by the non-inverting switched capacitor integrator circuit,
    a voltage difference between a first output terminal of the inverting switched capacitor integrator circuit and a second output terminal of the non-inverting switched capacitor integrator circuit is provided as an output of the switched capacitor integrator circuit, and
    wherein the first reset switch and the second reset switch synchronously operate in order to reset the inverting switched capacitor integrator circuit and the non-inverting switched capacitor integrator circuit during a time interval between two integration cycles.

13. The switched capacitor integrator circuit of claim 12, wherein the inverting switched capacitor integrator circuit integrates electric charges which are charged in the sampling capacitor with time to output a negative voltage, and the non-inverting switched capacitor integrator circuit integrates electric charges which are charged in the sampling capacitor with time to output a positive voltage.

14. The switched capacitor integrator circuit of claim 12, wherein at least a portion of integration time interval of the inverting switched capacitor integrator circuit does not overlap integration time interval of the non-inverting switched capacitor integrator circuit.

15. The switched capacitor integrator circuit of claim 12, wherein the sampling capacitor is formed by a sensing pattern and a driving pattern formed in a capacitive type touch screen.

16. The switched capacitor integrator circuit of claim 12, wherein one of both terminals of the sampling capacitor, which is connected to the inverting switched capacitor integrator circuit and the non-inverting switched capacitor integrator circuit, is an in-flowing path of noise input by cable or wireless.

17. An integrator circuit, comprising:
a capacitor;
a charge/discharge circuit connected to the capacitor to charge/discharge the capacitor;
an inverting integrator circuit connected to the charge/discharge circuit;
a non-inverting integrator circuit connected to the charge/discharge circuit;
a first reset switch for resetting the inverting integrator circuit; and
a second reset switch for resetting the non-inverting integrator circuit;
wherein, a voltage difference between a first output terminal of the inverting integrator circuit and a second output terminal of the non-inverting integrator circuit is provided as an output of the integrator circuit, and
wherein the first reset switch and the second reset switch synchronously operate in order to reset the inverting integrator circuit and the non-inverting integrator circuit during a time interval between two integration cycles.

18. The integrator circuit of claim 17, wherein the inverting integrator circuit integrates electric charges which are charged in the capacitor with time to output a negative voltage, and the non-inverting integrator circuit integrates electric charges which are charged in the capacitor with time to output a positive voltage.

19. The integrator circuit of claim 17, wherein the capacitor is formed by a sensing pattern and a driving pattern formed in a capacitive type touch screen.

20. The integrator circuit of claim 17, wherein one of both terminals of the capacitor, which is connected to the inverting integrator circuit and the non-inverting integrator circuit, is an in-flowing path of noise input by cable or wireless.

21. The integrator circuit of claim 17, wherein at least a portion of integration time interval of the inverting integrator circuit does not overlap integration time interval of the non-inverting integrator circuit.

* * * * *